(12) United States Patent
Aroli Veettil

(10) Patent No.: US 11,763,354 B2
(45) Date of Patent: *Sep. 19, 2023

(54) METHOD, SYSTEM, AND COMPUTER PROGRAM PRODUCT FOR USER COMMUNICATION WITH MERCHANTS ASSOCIATED WITH TRANSACTIONS

(71) Applicant: Visa International Service Association, San Francisco, CA (US)

(72) Inventor: Rajesh Kumar Aroli Veettil, Singapore (SG)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/950,152

(22) Filed: Sep. 22, 2022

(65) Prior Publication Data

US 2023/0017203 A1 Jan. 19, 2023

Related U.S. Application Data

(63) Continuation of application No. 16/630,700, filed as application No. PCT/US2017/042114 on Jul. 14, 2017, now Pat. No. 11,488,215.

(51) Int. Cl.
*G06Q 30/02* (2023.01)
*G06Q 20/10* (2012.01)

(52) U.S. Cl.
CPC ....... *G06Q 30/0281* (2013.01); *G06Q 20/102* (2013.01)

(58) Field of Classification Search
CPC ............. G06Q 30/0281; G06Q 20/102; G06Q 50/182; G06Q 50/188

(Continued)

(56) References Cited

U.S. PATENT DOCUMENTS 6,850,918 B1* 2/2005 Burchetta .............. G06Q 10/10
 705/80
8,160,941 B1* 4/2012 Field ..................... G06Q 40/12
 705/37

(Continued)

OTHER PUBLICATIONS

Barnett, J., & Treleaven, P. (2018). Algorithmic dispute resolution—The automation of professional dispute resolution using AI and blockchain technologies. The Computer Journal, 61(3), 399-408. (Year: 2018).*

(Continued)

*Primary Examiner* — Sarah M Monfeldt
*Assistant Examiner* — John S. Wasaff
(74) *Attorney, Agent, or Firm* — THE WEBB LAW FIRM

(57) ABSTRACT

Described are a method, system, and computer program product for facilitating communication between a user of a financial account and a merchant associated with at least one transaction with the financial account. The method includes receiving transaction data representative of the at least one transaction, the transaction data comprising at least one transaction identifier. The method also includes determining the merchant associated with the at least one transaction identifier and determining at least one merchant communication mode. The method further includes transmitting merchant contact data to a user device and receiving at least one selected communication mode. The method further includes generating a merchant communication session associated with the at least one selected communication mode and, in response to receiving the at least one selected communication mode, facilitating a communicative connection for the merchant communication session between the user and the merchant through the at least one selected communication mode.

20 Claims, 13 Drawing Sheets

(58) Field of Classification Search
USPC .......................................................... 705/346
See application file for complete search history.

(56) References Cited

U.S. PATENT DOCUMENTS

| | | | |
|---|---|---|---|
| 9,058,813 B1* | 6/2015 | Blanksteen | G10L 15/19 |
| 9,218,599 B1* | 12/2015 | Hilbring | G06Q 20/407 |
| 9,965,713 B2 | 5/2018 | Tsuchiya | |
| 9,965,743 B2* | 5/2018 | Sun | G06Q 10/10 |
| 2002/0038293 A1* | 3/2002 | Seiden | G07F 17/32 |
| | | | 348/E7.082 |
| 2003/0233292 A1* | 12/2003 | Richey | G06Q 40/12 |
| | | | 705/28 |
| 2003/0236679 A1* | 12/2003 | Galves | G06Q 50/182 |
| | | | 705/309 |
| 2004/0059596 A1* | 3/2004 | Vaidyanathan | G06Q 10/10 |
| | | | 705/309 |
| 2007/0198368 A1* | 8/2007 | Kannan | G06Q 30/02 |
| | | | 705/26.62 |
| 2007/0299920 A1* | 12/2007 | Crespo | H04L 51/48 |
| | | | 709/206 |
| 2008/0154783 A1* | 6/2008 | Rule | G06Q 50/188 |
| | | | 705/80 |
| 2009/0030710 A1* | 1/2009 | Levine | G06Q 40/00 |
| | | | 705/35 |
| 2009/0138386 A1* | 5/2009 | Wilson, Jr. | G06Q 40/02 |
| | | | 705/14.69 |
| 2010/0161457 A1* | 6/2010 | Katz | G06Q 20/10 |
| | | | 709/204 |
| 2010/0169194 A1* | 7/2010 | Richey | G06Q 30/016 |
| | | | 705/309 |
| 2012/0265697 A1* | 10/2012 | Tuchman | G06Q 30/016 |
| | | | 705/304 |
| 2012/0290458 A1* | 11/2012 | Marsan | G06Q 20/10 |
| | | | 705/35 |
| 2013/0080272 A1* | 3/2013 | Ronca | G06Q 30/06 |
| | | | 705/16 |
| 2013/0262281 A1* | 10/2013 | Puchek | G06Q 30/016 |
| | | | 705/309 |
| 2014/0012678 A1* | 1/2014 | Hayes, Jr. | G06Q 30/0276 |
| | | | 705/14.64 |
| 2014/0046768 A1* | 2/2014 | Hayes | G06Q 30/02 |
| | | | 705/14.64 |
| 2014/0129396 A1* | 5/2014 | Jakobsson | G06Q 50/182 |
| | | | 705/30 |
| 2014/0164256 A1* | 6/2014 | Booij | H04M 3/5183 |
| | | | 705/304 |
| 2014/0249917 A1* | 9/2014 | Groarke | G06Q 30/0226 |
| | | | 705/30 |
| 2014/0297362 A1* | 10/2014 | Kumar | G06Q 30/0253 |
| | | | 705/7.29 |
| 2016/0034906 A1* | 2/2016 | Stopic | G06Q 40/12 |
| | | | 705/30 |
| 2016/0055502 A1* | 2/2016 | Pitz | G06Q 20/3224 |
| | | | 705/7.34 |
| 2016/0117659 A1* | 4/2016 | Bedier | G06Q 20/20 |
| | | | 705/16 |
| 2016/0300214 A1* | 10/2016 | Chaffin | G06Q 20/22 |
| 2017/0195392 A1* | 7/2017 | Elad | H04L 65/1073 |
| 2017/0286952 A1* | 10/2017 | Gerard | G06Q 20/389 |
| 2018/0174137 A1* | 6/2018 | Subbarayan | G06Q 20/409 |
| 2021/0158368 A1* | 5/2021 | Baggett | G06Q 20/42 |

OTHER PUBLICATIONS

"The Chargeback Process: Explained" by Chargeback, accessed via Wayback Machine at https://web.archive.org/web/20170211101458/ https://chargeback.com/chargeback-process/. Original date: Feb. 11, 2017 (Year: 2017).*

"Chargeback Management Guidelines for Visa Merchants." Accessed at: https://usa.visa.com/dam/VCOM/global/support-legal/documents/ chargeback-management-guidelines-for-visa-merchants-vbs-19-may-16-%20v2.pdf. (Year: 2016).*

"The Chargeback Process: Explained", Chargeback, Feb. 11, 2017, available at https://web.archive.org/web/20170211101458/https:// chargeback.com/chargeback-process/.

* cited by examiner

METHOD, SYSTEM, AND COMPUTER PROGRAM PRODUCT FOR USER COMMUNICATION WITH MERCHANTS ASSOCIATED WITH TRANSACTIONS

CROSS-REFERENCE TO RELATED APPLICATIONS

This application is a continuation of U.S. patent application Ser. No. 16/630,700, having an effective filing date of Jul. 14, 2017, which is the United States national phase of International Application No. PCT/US2017/042114 filed Jul. 14, 2017, the disclosures of which are hereby incorporated by reference in their entireties.

BACKGROUND

1. Technical Field

Disclosed embodiments relate generally to a system and method for facilitating communication between a user of a financial account and a merchant, and in some non-limiting embodiments or aspects, to a system and method for determining merchant communication modes and generating merchant communication sessions automatically for the user.

2. Technical Considerations

Numerous shortcomings exist in communication between users of financial accounts (e.g., cardholders) and merchants after completing a financial transaction. Users may, at a later time, review their financial account activity and discover a need to contact a merchant associated with a particular transaction. Often, the impetus to contact merchants arises after the discovery of disparities between the transaction record and the recollection of the user. For example, the user may recall agreeing to pay a lesser amount for a transaction and may want to contact the merchant to resolve the difference. Perhaps more distressing, the user may believe the transaction to be the result of fraudulent activity and may need to contact the merchant to gather more information or ultimately stop the purchase. Whatever the motivation for contacting a merchant, a user likely does not have merchant contact information or sales records easily available. A user may need to search for receipts, invoices, or other correspondence before they can effectively reach out to a merchant.

Furthermore, when reviewing financial account records through an account interface provided by an issuer institution (e.g., an online banking portal), users are faced with limited merchant information. The merchant's operating name may not be available, and a merchant may be identified by a different business name that a user would not recognize. Additionally, merchants are often not displayed with their contact information, such as emails, phone numbers, addresses, and/or the like, which further requires users to independently research and discover that information. To that end, the eventual communication may require a merchant or user to share contact information or identifying information that they would prefer to keep private. In short, user communication with merchants is often characterized by frustrating, tedious, and manual user effort.

Therefore, there is a need in the art to efficiently and automatically determine merchant identity and contact information for a given transaction. Furthermore, there is a need in the art to automatically determine preferred and/or available modes of communication for a given merchant, provide the modes to a user for selection, and maintain the privacy of certain information for either party involved. Moreover, there is a need in the art to facilitate a communication session between the user and merchant without requiring complex user input, and thereafter tracking, grouping, and enriching one or more communication sessions for review by the user and/or merchant.

SUMMARY

Accordingly, and generally, provided is a system and computer-implemented method for facilitating communication between a user of a financial account and a merchant associated with at least one transaction with the financial account. Preferably, provided is a system and computer-implemented method for facilitating communication between a user and a merchant by receiving a transaction identifier, determining the merchant associated with the at least one transaction identifier, and determining at least one merchant communication mode associated with the merchant. Preferably, the system and computer-implemented method include transmitting merchant contact data to a user device of the user, receiving at least one selected communication mode, and generating a merchant communication session associated with the at least one selected communication mode. Preferably, the system and computer-implemented method include, in response to receiving the at least one selected communication mode, facilitating a communicative connection for the merchant communication session.

According to some non-limiting embodiments or aspects, provided is a computer-implemented method for facilitating communication between a user of a financial account and a merchant associated with at least one transaction with the financial account. The method includes receiving, with at least one processor, transaction data representative of the at least one transaction between the financial account and the merchant. The transaction data includes at least one transaction identifier. The method also includes determining, with at least one processor, the merchant associated with the at least one transaction identifier. The method further includes determining, with at least one processor, at least one merchant communication mode associated with the merchant. The at least one merchant communication mode includes at least one of the following: a text-based communication mode, an image-based communication mode, an audio-based communication mode, a video-based communication mode, or any combination thereof. The method further includes transmitting, with at least one processor, merchant contact data to a user device of the user. The merchant contact data is configured to generate or cause the generation of at least one visual representation of the at least one merchant communication mode on the user device. The method further includes receiving, with at least one processor, at least one selected communication mode of the at least one merchant communication mode. The method further includes, in response to receiving the at least one selected communication mode, generating, with at least one processor, a communicative connection of a merchant communication session between the user and the merchant through the at least one selected communication mode. The merchant communication session includes at least one of the following: text communication data, image communication data, audio communication data, video communication data, or any combination thereof, associated with the at least one selected communication mode.

In some non-limiting embodiments or aspects, the computer-implemented method may include associating, with at least one processor, a plurality of merchant communication sessions with the at least one transaction identifier. The method may also include generating, with at least one processor, a dispute resolution record in at least one database. The dispute resolution record may include at least a portion of the transaction data and the plurality of merchant communication sessions between the user and the merchant associated with the at least one transaction identifier. The method may further include transmitting, with at least one processor, a list of the plurality of merchant communication sessions and at least a portion of the transaction data to at least one of the user, the merchant, and an issuer institution. The method may further include modifying, with at least one processor, the merchant communication session to include at least a portion of the transaction data of the transaction represented by the at least one transaction identifier. The transaction data may further include at least one of the following: financial device holder identification data, transaction amount, transaction time, transaction description, or any combination thereof. The method may further include transmitting, with at least one processor, at least a portion of the transaction data to at least one of the user device and a merchant device of the merchant.

In some non-limiting embodiments or aspects, the communicative connection of the merchant communication session may be generated in a network environment, such that only specified financial account data is transmitted to the merchant device and/or only specified merchant data is transmitted to the user device. The merchant communication session may include audio communication data and the method may include facilitating a telephonic connection between the user device and at least one communication device of the merchant. The merchant communication session may include text communication data, and the generation of the communicative connection of the merchant communication session may include automatically populating an email, chat/messenger, or SMS communication at least partly with transaction data and transmitting the email, chat/messenger, or SMS communication to the merchant.

In some non-limiting embodiments or aspects, the method may include receiving, with at least one processor, one or more designated merchant communication modes from the merchant. The one or more designated merchant communication modes may be representative of permitted communication modes and may include a mapping of preferred contact data for each designated communication mode. The at least one merchant communication mode may be determined from the one or more designated merchant communication modes. The method may also include generating, with at least one processor, a merchant communication session identifier associated with the merchant communication session. The method may further include transmitting, with at least one processor, the merchant communication session identifier to the user device upon generation of the merchant communication session. The method may further include storing, with at least one processor, the merchant communication session identifier in association with the at least one transaction identifier in at least one database.

According to some non-limiting embodiments or aspects, provided is a system for facilitating communication between a user of a financial account and a merchant associated with at least one transaction with the financial account. The system includes at least one server computer including at least one processor. The at least one server computer is programmed and/or configured to receive transaction data representative of the at least one transaction between the financial account and the merchant. The transaction data includes at least one transaction identifier. The server computer is also programmed and/or configured to determine the merchant associated with the at least one transaction identifier and determine at least one merchant communication mode associated with the merchant. The at least one merchant communication mode is representative of at least one of the following types of communication: text, image, audio, video, or any combination thereof. The server computer is further programmed and/or configured to transmit merchant contact data to a user device of the user. The merchant contact data is configured to generate or cause the generation of at least one visual representation of the at least one merchant communication mode on the user device. The server computer is further programmed and/or configured to receive at least one selected communication mode of the at least one merchant communication mode. The server computer is further programmed and/or configured to generate a merchant communication session associated with the at least one selected communication mode. The server computer is further programmed and/or configured to, in response to receiving the at least one selected communication mode, facilitate a communicative connection for the merchant communication session between the user and the merchant through the at least one selected communication mode.

In some non-limiting embodiments or aspects, the at least one server computer may be programmed and/or configured to associate a plurality of merchant communication sessions with the at least one transaction identifier. The system may also include at least one database. The at least one server computer may also be programmed and/or configured to generate a dispute resolution record in the at least one database. The dispute resolution record may include at least a portion of the transaction data and the plurality of merchant communication sessions between the user and the merchant associated with the at least one transaction identifier. The at least one server computer may be further programmed and/or configured to transmit a list of the plurality of merchant communication sessions and at least a portion of the transaction data to at least one of the user, the merchant, and an issuer institution. The at least one server computer may be further programmed and/or configured to modify the merchant communication session to include at least a portion of the transaction data of the transaction represented by the at least one transaction identifier. The transaction data may further include at least one of the following: financial device holder identification data, transaction amount, transaction time, transaction description, or any combination thereof. The at least one server computer may be further programmed and/or configured to transmit at least a portion of the transaction data to at least one of the user device and a merchant device of the merchant.

In some non-limiting embodiments or aspects, the communicative connection of the merchant communication session may be generated in a network environment, such that only specified financial account data is transmitted to the merchant device and/or only specified merchant data is transmitted to the user device. The merchant communication session may include audio communication data, and the at least one server computer may be programmed and/or configured to facilitate a telephonic connection between the user device and at least one communication device of the merchant. The merchant communication session may include text communication data, and the generation of the communicative connection of the merchant communication session may include automatically populating an email, chat/messenger, or SMS communication at least partly with transaction data and transmitting the email, chat/messenger, or SMS communication to the merchant.

In some non-limiting embodiments or aspects, the at least one server computer may be programmed and/or configured to receive one or more designated merchant communication modes from the merchant. The one or more designated merchant communication modes may be representative of permitted communication modes and may include a mapping of preferred contact data for each designated communication mode. The at least one merchant communication mode may be determined from the one or more designated merchant communication modes. The at least one server computer may also be programmed and/or configured to generate a merchant communication session identifier associated with the merchant communication session. The at least one server computer may be further programmed and/or configured to transmit the merchant communication session identifier to the user device upon generation of the merchant communication session. The at least one server computer may be further programmed and/or configured to store the merchant communication session identifier in association with the at least one transaction identifier in at least one database.

According to some non-limiting embodiments or aspects, provided is a computer program product for facilitating communication between a user of a financial account and a merchant associated with at least one transaction with the financial account. The computer program product includes at least one non-transitory computer-readable medium including program instructions that, when executed by at least one processor, cause the at least one processor to receive transaction data representative of the at least one transaction between the financial account and the merchant. The transaction data includes at least one transaction identifier. The program instructions also cause the at least one processor to determine the merchant associated with the at least one transaction identifier and determine at least one merchant communication mode associated with the merchant. The at least one merchant communication mode is representative of at least one of the following types of communication: text, image, audio, video, or any combination thereof. The program instructions further cause the at least one processor to transmit merchant contact data to a user device of the user. The merchant contact data is configured to generate or cause the generation of at least one visual representation of the at least one merchant communication mode on the user device. The program instructions further cause the at least one processor to receive at least one selected communication mode of the at least one merchant communication mode. The program instructions further cause the at least one processor to generate a merchant communication session associated with the at least one selected communication mode. The program instructions further cause the at least one processor to, in response to receiving the at least one selected communication mode, facilitate a communicative connection for the merchant communication session between the user and the merchant through the at least one selected communication mode.

In some non-limiting embodiments or aspects, the program instructions may cause the at least one processor to associate a plurality of merchant communication sessions with the at least one transaction identifier. The program instructions may also cause the at least one processor to generate a dispute resolution record in at least one database. The dispute resolution record may include at least a portion of the transaction data and the plurality of merchant communication sessions between the user and the merchant associated with the at least one transaction identifier. The program instructions may further cause the at least one processor to transmit a list of the plurality of merchant communication sessions and at least a portion of the transaction data to at least one of the user, the merchant, and an issuer institution. The program instructions may further cause the at least one processor to modify the merchant communication session to include at least a portion of the transaction data of the transaction represented by the at least one transaction identifier. The transaction data may further include at least one of the following: financial device holder identification data, transaction amount, transaction time, transaction description, or any combination thereof. The program instructions may further cause the at least one processor to transmit at least a portion of the transaction data to at least one of the user device and a merchant device of the merchant.

In some non-limiting embodiments or aspects, the communicative connection of the merchant communication session may be generated in a network environment, such that only specified financial account data is transmitted to the merchant device and/or only specified merchant data is transmitted to the user device. The merchant communication session may include audio communication data, and the program instructions may cause the at least one processor to facilitate a telephonic connection between the user device and at least one communication device of the merchant. The merchant communication session may include text communication data, and the generation of the communicative connection of the merchant communication session may include automatically populating an email, chat/messenger, or SMS communication at least partly with transaction data and transmitting the email, chat/messenger, or SMS communication to the merchant.

In some non-limiting embodiments or aspects, the program instructions may cause the at least one processor to receive one or more designated merchant communication modes from the merchant. The one or more designated merchant communication modes may be representative of permitted communication modes and may include a mapping of preferred contact data for each designated communication mode. The at least one merchant communication mode may be determined from the one or more designated merchant communication modes. The program instructions may also cause the at least one processor to generate a merchant communication session identifier associated with the merchant communication session. The program instructions may further cause the at least one processor to transmit the merchant communication session identifier to the user device upon generation of the merchant communication session. The program instructions may also cause the at least one processor to store the merchant communication session identifier in association with the at least one transaction identifier in at least one database.

Further non-limiting embodiments or aspects of the present disclosure will be set forth in the following numbered clauses:

Clause 1: A computer-implemented method for facilitating communication between a user of a financial account and a merchant associated with at least one transaction with the financial account, the method comprising: receiving, with at least one processor, transaction data representative of the at least one transaction between the financial account and the merchant, the transaction data comprising at least one transaction identifier; determining, with at least one processor, the merchant associated with the at least one transaction identifier; determining, with at least one processor, at least one merchant communication mode associated with the merchant, the at least one merchant communication mode representative of at least one of the following types of communication: text, image, audio, video, or any combination thereof; transmitting, with at least one processor, merchant contact data to a user device of the user, the merchant contact data configured to generate or cause the generation of at least one visual representation of the at least one merchant communication mode on the user device; receiving, with at least one processor, at least one selected communication mode of the at least one merchant communication mode; generating, with at least one processor, a merchant communication session associated with the at least one selected communication mode; and in response to receiving the at least one selected communication mode, facilitating, with at least one processor, a communicative connection for the merchant communication session between the user and the merchant through the at least one selected communication mode.

Clause 2: The computer-implemented method of clause 1, further comprising associating, with at least one processor, a plurality of merchant communication sessions with the at least one transaction identifier.

Clause 3: The computer-implemented method of clause 1 or 2, further comprising generating, with at least one processor, a dispute resolution record in at least one database, the dispute resolution record comprising at least a portion of the transaction data and the plurality of merchant communication sessions between the user and the merchant associated with the at least one transaction identifier.

Clause 4: The computer-implemented method of any of clauses 1-3, further comprising transmitting, with at least one processor, a list of the plurality of merchant communication sessions and at least a portion of the transaction data to at least one of the user, the merchant, and an issuer institution.

Clause 5: The computer-implemented method of any of clauses 1-4, further comprising: modifying, with at least one processor, the merchant communication session to comprise at least a portion of the transaction data of the transaction represented by the at least one transaction identifier, the transaction data further comprising at least one of the following: financial device holder identification data, transaction amount, transaction time, transaction description, or any combination thereof; and transmitting, with at least one processor, at least a portion of the transaction data to at least one of the user device and a merchant device of the merchant.

Clause 6: The computer-implemented method of any of clauses 1-5, wherein the communicative connection of the merchant communication session is generated in a network environment, such that only specified financial account data is transmitted to the merchant device and/or only specified merchant data is transmitted to the user device.

Clause 7: The computer-implemented method of any of clauses 1-6, wherein the merchant communication session comprises audio communication data, the method further comprising facilitating a telephonic connection between the user device and at least one communication device of the merchant.

Clause 8: The computer-implemented method of any of clauses 1-7, wherein the merchant communication session comprises text communication data, and wherein the generation of the communicative connection of the merchant communication session comprises automatically populating an email, chat/messenger, or SMS communication at least partly with transaction data and transmitting the email, chat/messenger, or SMS communication to the merchant.

Clause 9: The computer-implemented method of any of clauses 1-8, further comprising receiving, with at least one processor, one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

Clause 10: The computer-implemented method of any of clauses 1-9, further comprising: generating, with at least one processor, a merchant communication session identifier associated with the merchant communication session; transmitting, with at least one processor, the merchant communication session identifier to the user device upon generation of the merchant communication session; and storing, with at least one processor, the merchant communication session identifier in association with the at least one transaction identifier in at least one database.

Clause 11: A system for facilitating communication between a user of a financial account and a merchant associated with at least one transaction with the financial account, the system comprising at least one server computer including at least one processor, the at least one server computer programmed and/or configured to: receive transaction data representative of the at least one transaction between the financial account and the merchant, the transaction data comprising at least one transaction identifier; determine the merchant associated with the at least one transaction identifier; determine at least one merchant communication mode associated with the merchant, the at least one merchant communication mode representative of at least one of the following types of communication: text, image, audio, video, or any combination thereof; transmit merchant contact data to a user device of the user, the merchant contact data configured to generate or cause the generation of at least one visual representation of the at least one merchant communication mode on the user device; receive at least one selected communication mode of the at least one merchant communication mode; generate a merchant communication session associated with the at least one selected communication mode; and in response to receiving the at least one selected communication mode, facilitate a communicative connection for the merchant communication session between the user and the merchant through the at least one selected communication mode.

Clause 12: The system of clause 11, wherein the at least one server computer is further programmed and/or configured to associate a plurality of merchant communication sessions with the at least one transaction identifier.

Clause 13: The system of clause 11 or 12, further comprising at least one database, and wherein the at least one server computer is further programmed and/or configured to generate a dispute resolution record in the at least one database, the dispute resolution record comprising at least a portion of the transaction data and the plurality of merchant communication sessions between the user and the merchant associated with the at least one transaction identifier.

Clause 14: The system of any of clauses 11-13, wherein the at least one server computer is further programmed and/or configured to transmit a list of the plurality of merchant communication sessions and at least a portion of the transaction data to at least one of the user, the merchant, and an issuer institution.

Clause 15: The system of any of clauses 11-14, wherein the at least one server computer is further programmed and/or configured to: modify the merchant communication session to comprise at least a portion of the transaction data of the transaction represented by the at least one transaction identifier, the transaction data further comprising at least one of the following: financial device holder identification data, transaction amount, transaction time, transaction description, or any combination thereof; and transmit at least a portion of the transaction data to at least one of the user device and a merchant device of the merchant.

Clause 16: The system of any of clauses 11-15, wherein the communicative connection of the merchant communication session is generated in a network environment, such that only specified financial account data is transmitted to the merchant device and/or only specified merchant data is transmitted to the user device.

Clause 17: The system of any of clauses 11-16, wherein the merchant communication session comprises audio communication data, and wherein the at least one server computer is further programmed and/or configured to facilitate a telephonic connection between the user device and at least one communication device of the merchant.

Clause 18: The system of any of clauses 11-17, wherein the merchant communication session comprises text communication data, and wherein the generation of the communicative connection of the merchant communication session comprises automatically populating an email, chat/messenger, or SMS communication at least partly with transaction data and transmitting the email, chat/messenger, or SMS communication to the merchant.

Clause 19: The system of any of clauses 11-18, wherein the at least one server computer is further programmed and/or configured to receive one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

Clause 20: The system of any of clauses 11-19, wherein the at least one server computer is further programmed and/or configured to: generate a merchant communication session identifier associated with the merchant communication session; transmit the merchant communication session identifier to the user device upon generation of the merchant communication session; and store the merchant communication session identifier in association with the at least one transaction identifier in at least one database.

Clause 21: A computer program product for facilitating communication between a user of a financial account and a merchant associated with at least one transaction with the financial account, comprising at least one non-transitory computer-readable medium including program instructions that, when executed by at least one processor, cause the at least one processor to: receive transaction data representative of the at least one transaction between the financial account and the merchant, the transaction data comprising at least one transaction identifier; determine the merchant associated with the at least one transaction identifier; determine at least one merchant communication mode associated with the merchant, the at least one merchant communication mode representative of at least one of the following types of communication: text, image, audio, video, or any combination thereof; transmit merchant contact data to a user device of the user, the merchant contact data configured to generate or cause the generation of at least one visual representation of the at least one merchant communication mode on the user device; receive at least one selected communication mode of the at least one merchant communication mode; generate a merchant communication session associated with the at least one selected communication mode; and in response to receiving the at least one selected communication mode, facilitate a communicative connection for the merchant communication session between the user and the merchant through the at least one selected communication mode.

Clause 22: The computer program product of clause 21, wherein the program instructions further cause the at least one processor to associate a plurality of merchant communication sessions with the at least one transaction identifier.

Clause 23: The computer program product clause 21 or 22, wherein the program instructions further cause the at least one processor to generate a dispute resolution record in at least one database, the dispute resolution record comprising at least a portion of the transaction data and the plurality of merchant communication sessions between the user and the merchant associated with the at least one transaction identifier.

Clause 24: The computer program product of any of clauses 21-23, wherein the program instructions further cause the at least one processor to transmit a list of the plurality of merchant communication sessions and at least a portion of the transaction data to at least one of the user, the merchant, and an issuer institution.

Clause 25: The computer program product of any of clauses 21-24, wherein the program instructions further cause the at least one processor to: modify the merchant communication session to comprise at least a portion of the transaction data of the transaction represented by the at least one transaction identifier, the transaction data further comprising at least one of the following: financial device holder identification data, transaction amount, transaction time, transaction description, or any combination thereof; and transmit at least a portion of the transaction data to at least one of the user device and a merchant device of the merchant.

Clause 26: The computer program product of any of clauses 21-25, wherein the communicative connection of the merchant communication session is generated in a network environment, such that only specified financial account data is transmitted to the merchant device and/or only specified merchant data is transmitted to the user device.

Clause 27: The computer program product of any of clauses 21-26, wherein the merchant communication session comprises audio communication data, and wherein the program instructions further cause the at least one processor to facilitate a telephonic connection between the user device and at least one communication device of the merchant.

Clause 28: The computer program product of any of clauses 21-27, wherein the merchant communication session comprises text communication data, and wherein the generation of the communicative connection of the merchant communication session comprises automatically populating an email, chat/messenger, or SMS communication at least partly with transaction data and transmitting the email, chat/messenger, or SMS communication to the merchant.

Clause 29: The computer program product of any of clauses 21-28, wherein the program instructions further cause the at least one processor to receive one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

Clause 30: The computer program product of any of clauses 21-29, wherein the program instructions further cause the at least one processor to: generate a merchant communication session identifier associated with the merchant communication session; transmit the merchant communication session identifier to the user device upon generation of the merchant communication session; and store the merchant communication session identifier in association with the at least one transaction identifier in at least one database.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
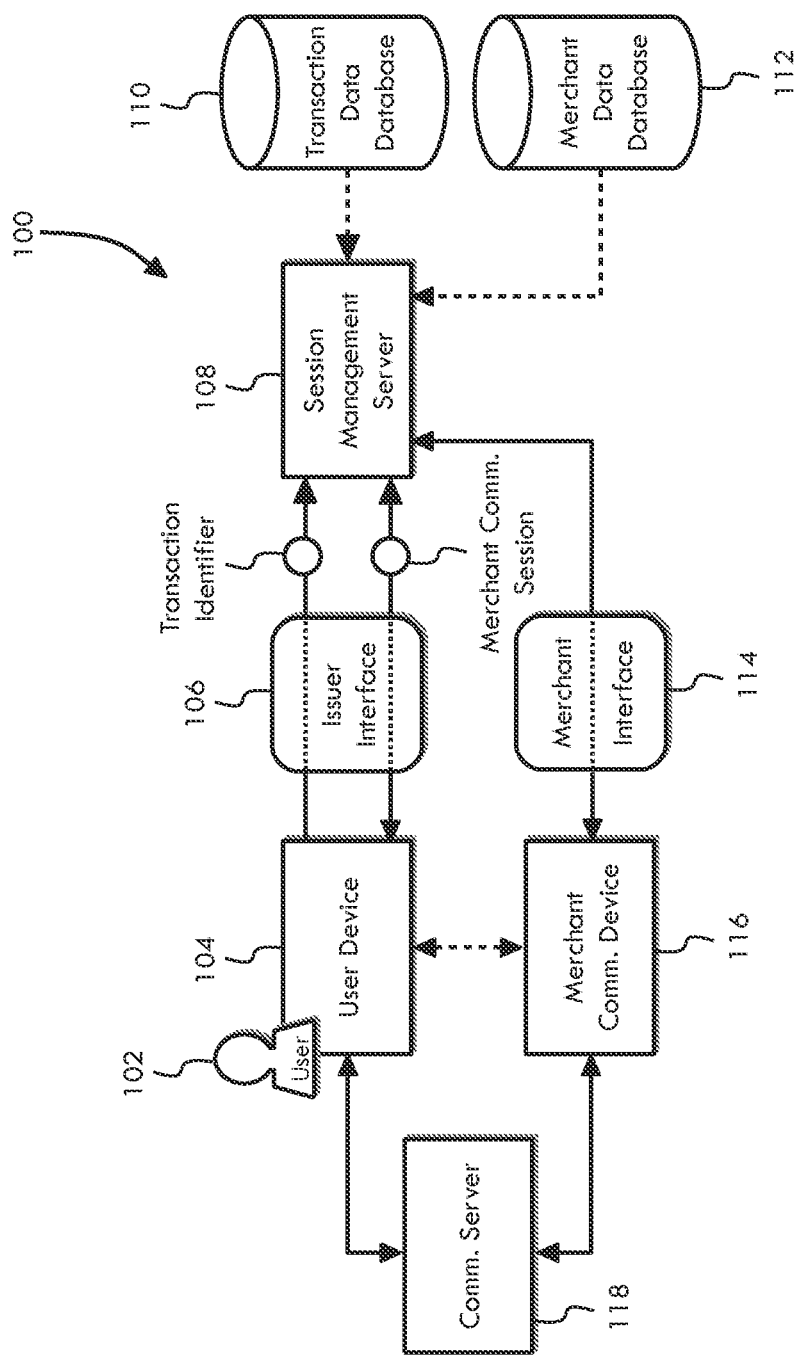
FIG. 1 is a schematic diagram of some non-limiting embodiments or aspects of a method and system facilitating communication between a user of a financial account and a merchant associated with at least one transaction with the financial account.

For purposes of the description hereinafter, the terms "upper", "lower", "right", "left", "vertical", "horizontal", "top", "bottom", "lateral", "longitudinal" and derivatives thereof shall relate to the disclosure as it is oriented in the drawing figures. However, it is to be understood that the disclosure may assume various alternative variations and step sequences, except where expressly specified to the contrary. It is also to be understood that the specific devices and process illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "issuer institution" may refer to one or more entities, such as a bank, that provides accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. As used herein, the term "account identifier" may include one or more PANs, tokens, or other identifiers associated with a customer account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "merchant" refers to any individual or entity that provides goods, and/or services, or access to goods and/or services, to customers based on a transaction, such as a payment transaction. Merchants may include, but are not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of merchants are within the scope of this disclosure.

As used herein, the term "financial device" may refer to a portable financial device, a payment device, an electronic payment device, a portable (e.g., physical) payment card, a gift card, a smartcard, a smart media, a payroll card, a healthcare card, a wrist band, a machine-readable medium containing account information, a keychain device, a supermarket discount card, a cellular phone, a mobile device, a personal digital assistant, a pager, a security card, a computer, an access card, a wireless terminal, or a transponder. The financial device may include a volatile or a non-volatile memory to store information, such as the account number or a name of the account holder. The term "financial device" may also refer to any unique identifier, physical or digital, associated with a financial transaction account that can be used to complete a transaction between a user of the financial device and another party, such as a merchant. For example, a financial device may be a financial transaction account number and confirmation code that may be entered into an online store payment interface. It will be appreciated that many other configurations and embodiments are possible.

As used herein, the term "merchant system" may refer to one or more server computers, point-of-sale devices, online interfaces, third party hosted services, and/or the like that are used to complete transactions with one or more financial devices. The term merchant system may also refer to one or more server computers, processors, online interfaces, third party hosted services, and/or the like that are used to transmit and/or receive communications with issuer institutions, transaction service providers, transaction processing servers, financial device holders, and/or the like.

As used herein, the term "transaction service provider" may refer to an entity that collects authorization requests from merchants and provides guarantees of payment, in some cases through an agreement between the transaction service provider and an issuer institution.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices.

As used herein, the term "financial account" may refer to any arrangement wherein physical or digital money may be deposited or withdrawn. One preferred and non-limiting example of a financial account is a bank account, to which may be linked to one or more financial devices by which transactions may be completed, e.g., merchant transactions. Financial accounts may be accessed, managed, viewed, and/or the like by a user, such as through online interfaces provided by issuer institutions. The interfaces may have functionality related to or provided by transaction service providers. One preferred and non-limiting example of a user of a financial account is a financial device holder, but users may also include account managers, accountants, account supervisors, and/or the like.

Non-limiting embodiments or aspects of the present disclosure are directed to computer-implemented systems and methods for facilitating communication between a user, e.g., a financial device holder, and a merchant. Embodiments or aspects of the present disclosure provide at least one server for receiving data from and transmitting data to user devices, such as through online user interfaces for managing a financial account. In some non-limiting embodiments or aspects, a user may access an interface for a financial account on their user device (e.g., desktop computer, laptop, tablet, smartphone, etc.). The interface may provide an application program interface (API) layer for communicating with transaction service provider systems, including a communication session management server. The system of the present disclosure provides for receiving a user designation of one or more transactions on the user device, which is received by the session management server for determining available communication modes with an associated merchant. Also provided are automatically-generated communications of available communication modes transmitted to the user device, and thereafter facilitating a communication session between the user and the merchant. The system has the technical benefit of eliminating disparate user actions of manually reviewing transaction accounts, seeking merchant identification information through search engines, determining best modes of communication, and independently initiating communications with merchants. Additionally, the system improves on existing technologies by enriching communications with automatically-retrieved transaction data, and by further obfuscating information that either the user or the merchant wish to keep private. Moreover, embodiments or aspects of the present disclosure provide the tools and systems to track, group, and display separate communication sessions between users and merchants, so that transaction-related conversations may be monitored and managed.

With specific reference to FIG. 1, and in some non-limiting embodiments or aspects, provided is a method and system 100 for facilitating communication between a user 102 of a financial account and a merchant associated with at least one transaction with the financial account. A user 102 associated with a financial account may access financial account data on a user device 104, e.g., a desktop computer, a laptop computer, a tablet, a smartphone, and/or the like. The user device 104 may display financial account data through an issuer interface 106. By way of example, the issuer interface may be a native software application on the user device 104 for accessing financial account information. By way of further example, the issuer interface 106 may be an online portal with an API integration layer that is accessible by a network browser on the user device 104. It will be appreciated that many configurations and arrangements of issuer interface 106 are possible. The transaction data is representative of one or more transactions completed between the financial account and one or more merchants. The transaction data may be visually represented in the issuer interface 106 as a list of purchases from merchants by a financial device associated with the financial account. The user 102 may be the financial device holder who, via the issuer interface 106 displayed on the user device 104, may review their previous transactions for their financial device.

With further reference to FIG. 1, and in some non-limiting embodiments or aspects, the user 102 may select a transaction shown in the issuer interface 106. For example, the user 102 may remember agreeing to pay a different amount for the transaction and may want to contact the merchant to dispute the cost of the transaction. In another example, the user 102 may not have authorized the transaction and may want to contact the merchant to dispute the transaction or gather information about the transaction. It will be appreciated that other scenarios may apply. Transaction data for the selected transaction is communicated to a session management server 108. The transaction data preferably includes a unique transaction identifier, by which the selected transaction may be identified. The session management server 108 may be associated with an issuer institution, a transaction service provider, or another entity. If the transaction data received by the session management server 108 does not include a merchant identifier, the session management server 108 may communicate with a transaction data database 110 to determine the identity of the merchant associated with the selected transaction. The communicated transaction data, however, may inherently include a merchant identifier that can be determined directly by the session management server 108. The transaction data database 110 may be a data storage device having transaction information for one or more transaction accounts. Although the transaction data database 110 is preferably associated with a transaction service provider, the transaction data database 110 may be associated with an issuer institution or other entity that maintains a collection of financial transaction information. It will be appreciated that other configurations are possible.

With further reference to FIG. 1, and in some non-limiting embodiments or aspects, the session management server 108 determines the configured contact options for the associated merchant, in the form of predetermined (e.g., preferred) communication modes. Predetermined communication modes may be a combination of one or more communication mode types, such as a text-based communication mode, an image-based communication mode, an audio-based communication mode, and/or a video-based communication mode. For example, email or short message service (SMS) communications are types of text-based communication modes. A video teleconference communication may be a combination of audio- and video-based communication modes. Communication over internet protocol (such as employed by Skype, Google Hangouts, and the like), provide a means for any combination of text, audio, or visual communication. It will be appreciated that the predetermined communication modes for a given merchant may have many configurations. The configured communication modes for one or more merchants may be stored in a merchant data database 112, which may also be the same database as the transaction data database 110. The merchant data database 112 may be associated with a transaction service provider, issuer institution, or other entity. After determining the available predetermined communication modes for the associated merchant, the session management server 108 may generate communication sessions and related software handles for the sessions. A communication session includes the necessary data structures, addresses, and/or libraries to facilitate a communicative connection between a user and a merchant. If the session management server 108 generates the communication sessions before a user 102 selects a communication mode, the session management server 108 may transmit communication session handles to the user which correspond to the available communication modes. The user 102 may then select a communication mode in the issuer interface 106 to trigger initiation of a communicative connection within the related, generated communication session. Alternatively, the session management server 108 may transmit data configured to display on the issuer interface 106 visual representations of the available communication modes, and upon selection by a user 102, the session management server 108 may then generate the corresponding communication session. In whichever configuration is employed, a communicative connection between the user 102 and the merchant is generated in response to a user 102 selection of a communication mode for contacting a merchant. It will also be appreciated that the predetermined merchant communication modes may be transmitted to the user device 104 along with the transaction data for display in the issuer interface 106 prior to the user's selection of a transaction. Other configurations are possible.

With further reference to FIG. 1, and in some non-limiting embodiments or aspects, the session management server 108 may automatically generate a communication related to the selected transaction and transmit the communication to the associated merchant. By way of example, the user 102 may select a transaction, view the available merchant communication modes, choose an "email" communication mode from the list of available communication modes, and, in response, the session management server 108 may automatically generate an email to the merchant containing relevant transaction and user 102 information. Automatically generated communications may be enriched with data from the transaction data database 110 to include transaction data that may be relevant to the correspondence, such as financial device holder identification data (e.g., cardholder name, cardholder address, cardholder date of birth, etc.), transaction amount, transaction time, transaction description, or any combination thereof. Communications may also be automatically generated by a communication server 118, which may be the same server as the session management server 108. Automatically generated communications may be further presented to the user 102 before being transmitted to the merchant, such that the user 102 may add, edit, or remove information from the communication prior to it being sent. For example, the automatically generated communication may be an email, which may be enriched with a transaction date, a transaction description, and a transaction amount. The user 102 may then enter a reason for the communication, such as: "I am disputing this transaction. I did not make this purchase and believe my card may have been forged." The session management server 108 or communication server 118 may then transmit the communication to the merchant. It will be appreciated that many configurations and arrangements for generated communications are possible.

With further reference to FIG. 1, and in some non-limiting embodiments or aspects, upon selection of a communication mode by the user 102, the user device 104 may be automatically, directly, and communicatively connected to a merchant communication device 116. By way of example, the user 102 may select a transaction, view the available communication modes for the associated merchant, and select a "phone" communication mode. The user device 104 may then automatically dial an associated phone number of the merchant, which places the user device 104 in communication with the merchant communication device 116. It will be appreciated that such direct or substantially direct communicative connections between user devices 104 and merchant communication devices 116 may be completed for other communication modes. The communication between a user device 104 and a merchant communication device 116 may also be facilitated by a communication server 118, which may be the same server as the session management server 108. The identifying address of the user device 104 and the identifying address of the merchant communication device 116 may be kept private by routing the communicative connection through the communication server 118. In some non-limiting embodiments or aspects, the communication server 118 is a cloud communications platform (e.g., Twilio, Plivo, Nexmo, etc.). Moreover, by connecting the user device 104 and the merchant communication device 116 through a communication server 118, alternative communication modes may be used where pre-existing phone accounts, email accounts, and/or the like are not required. Other configurations of communicative connections are possible.

With further reference to FIG. 1, and in some non-limiting embodiments or aspects, the merchant may use a same or different merchant communication device 116 to set the preferred, predetermined communication modes. The merchant may access a merchant interface 114, which may directly or indirectly access a merchant data database 112 where the predetermined communication modes are stored. The merchant interface 114 may add, edit, or remove communication modes and/or preferences from the merchant data database 112 through facilitation by the session management server 108. It will be appreciated that one or more merchant communication sessions may be stored in association with their corresponding transaction identifier in the merchant data database 112 and/or the transaction data database 110, for access by merchants or users 102. A list of previous merchant communication sessions may be provided to the user 102 through the issuer interface 106, and it may be provided to the merchant through the merchant interface 114. The list of previous merchant communication sessions may be included in a new communication session when it is generated, so that a user 102 and/or merchant may have access to the history of communications. Merchant communication sessions may be designated by a generated identifier, so that they can be referenced and recalled by the user 102 and/or merchant. Other configurations are possible.

Figure 2:
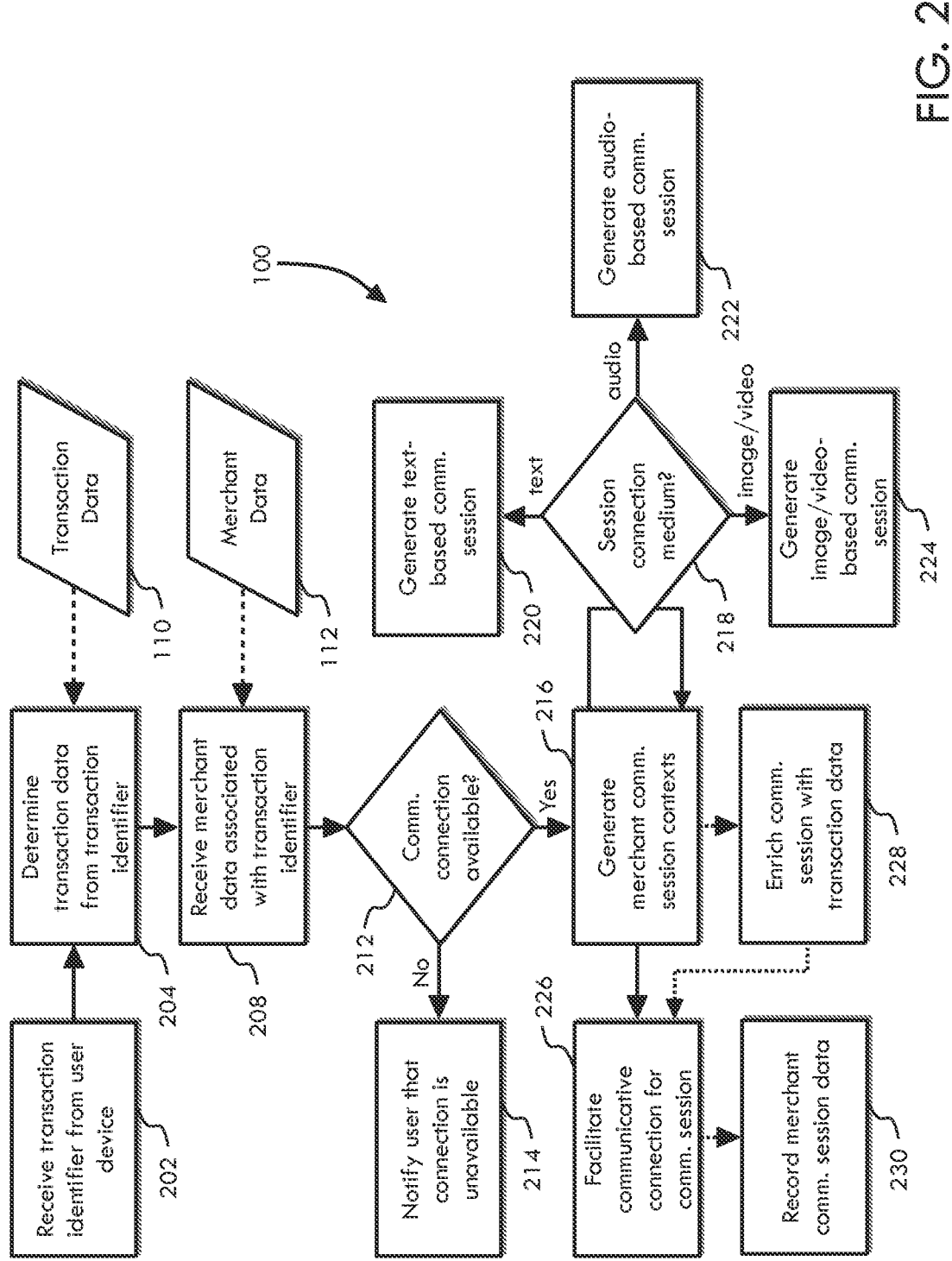
FIG. 2 is a process diagram of some non-limiting embodiments or aspects of a method and system for facilitating communication between a user of a financial account and a merchant associated with at least one transaction with the financial account.

With specific reference to FIG. 2, and in some non-limiting embodiments or aspects, provided is a method and system 100 for facilitating communication between a user 102 of a financial account and a merchant associated with at least one transaction with the financial account. Depicted is a process diagram of a computer-implemented method for execution by at least one processor, such as that of the session management server 108 and/or the communication server 118. At step 202, the processor receives at least one transaction identifier from a user device 104, the transaction identifier representative of a transaction selected by a user 102. The processes described herein may be executed for one or more transaction identifiers, representative of one or more selected transactions. The transaction identifier may itself be included in a set of transaction data that is transmitted from the user device 104. At step 204, the processor may receive additional transaction data related to the transaction identifier, such as from a transaction data database 110. The transaction data, either received from the user device 104 or retrieved from the transaction data database 110, may include: financial device holder identification data (e.g., cardholder name, cardholder address, cardholder date of birth, etc.), transaction amount, transaction time, transaction description, or any combination thereof. A merchant identifier associated with the transaction identifier may be received at step 202 or retrieved at step 204. Based on the associated merchant identifier, a step 208, one or more predetermined merchant communication modes may be received from a merchant data database 112. It will be appreciated that the merchant data database 112 may be the same database as the transaction data database 110. At step 212, the processor determines if there is at least one available predetermined communication mode for the associated merchant. If there is not, the processor may notify the user 102 at step 214 that there are no available communication modes. If there is at least one communication mode available for the associated merchant, the processor may then generate merchant communication session contexts at step 216.

With further reference to FIG. 2, and in some non-limiting embodiments or aspects, the processor may generate one or more communication sessions at step 218, through a real-time mapping cache/data store. By way of example, if the communication mode is a text-based communication mode (e.g., email, chat/messenger, short messaging service, etc.), the processor may generate a text-based communication session, such as at step 220. If the communication mode is an audio-based communication mode (e.g., telephone, voice over internet protocol, voice message, etc.), the processor may generate an audio-based communication session, such as at step 222. If the communication mode is an image-based or video-based communication mode (e.g., videotelephony, video over internet protocol, etc.) the processor may generate an image-based or video-based communication session, such as at step 224. It will be appreciated that a given communication mode may include one or more types of communication, such as text, image, audio, and/or video, and therefore steps 220, 222, and 224 can be considered both alone and in combination. At step 216, the merchant communication sessions may be generated in response to a user 102 selection of a specific communication mode, or the merchant communication sessions may be generated before a user 102 makes a selection of a communication mode. Using transaction data collected at step 204, or receiving transaction data after merchant communication sessions are generated at step 216, the merchant communication sessions may be enriched with the transaction data 228. Transaction data may be provided to the merchant to provide additional information and context to the user's 102 communication. At step 226, a communicative connection is established for the merchant communication session, either through direct communication between a user device 104 and a merchant communication device 116, or by facilitation through a communication server 118. Merchant communication session data (e.g., connection time of day, connection duration, transaction data, merchant personnel identification data, user 102 identification data, etc.) may also be stored in association with the transaction identifier, so that one or more completed merchant communication sessions may be later recalled by users 102 and/or merchants. It will be appreciated that other configurations are possible.

Figure 3:
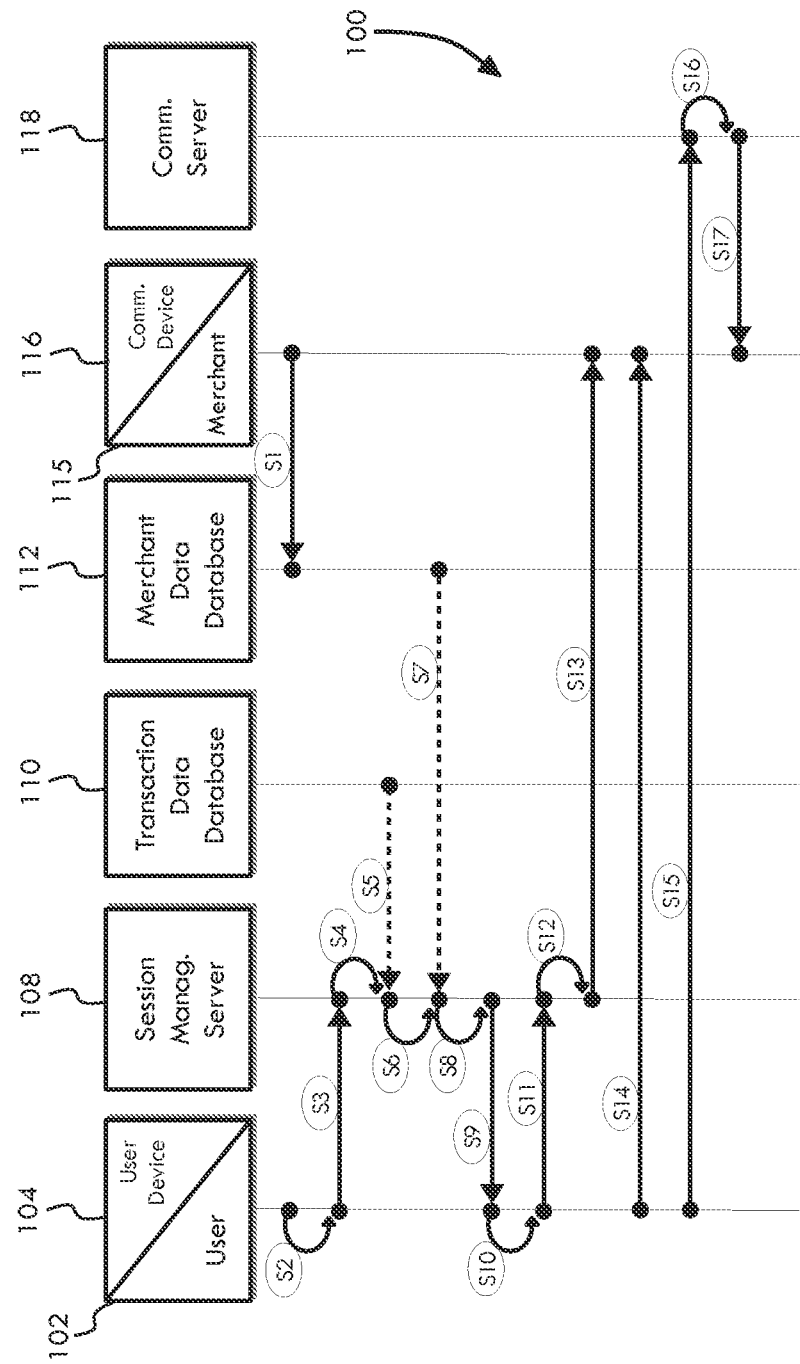
FIG. 3 is a process diagram of some non-limiting embodiments or aspects of a method and system for facilitating communication between a user of a financial account and a merchant associated with at least one transaction with the financial account.

With specific reference to FIG. 3, and in some non-limiting embodiments or aspects, provided is a method and system 100 for facilitating communication between a user 102 of a financial account and a merchant 115 associated with at least one transaction with the financial account. At S1, a merchant 115 uses a merchant communication device 116, potentially by using a merchant interface 114, to configure its contact settings. The contact settings include preferred (also called "predetermined") communication modes, contact addresses/numbers, contact personnel, and/or the like, and may be stored in the merchant data database 112. At S2, a user 102, via an issuer interface 106 on a user device 104, selects one or more transactions. At S3, transaction data associated with the selected transaction is communicated to a session management server 108. The transaction data may include a transaction identifier and/or a merchant identifier, which is determined at S4. If a merchant identifier is received by the session management server 108 from the user device 104, the session management server may proceed to S7 to receive the predetermined communication modes from the merchant data database 112. If the transaction data does not include a merchant identifier but instead includes a transaction identifier, the session management server 108 may then communicate with the transaction data database 110 at S5 to a merchant identifier. Additional transaction data may be retrieved at S5, if not already provided at S3, such as financial device holder identification data (e.g., cardholder name, cardholder address, cardholder date of birth, etc.), transaction amount, transaction time, transaction description, or any combination thereof. At S6, the session management server 108 determines an associated merchant identifier from the received transaction data. At S7, the session management server 108 receives the predetermined merchant communication modes that were configured by the merchant at S1.

With further reference to FIG. 3, and in some non-limiting embodiments and aspects, the session management server 108 generates merchant communication sessions corresponding to the one or more predetermined communication modes, at S8. At S8, the communication sessions may also be enriched (e.g., augmented with additional information) with the received transaction data. At S9, the session management server 108 communicates communication session handles to the user device 104. Alternatively, the session management server 108 may generate at S8 display data, that when transmitted at S9, is configured to display to the user 102 the available communication modes for the associated merchant 115, and thereafter generate the communication sessions in response to user 102 selection of a particular mode. At S10, the user 102 selects a particular communication mode on the user device 104. Either a communication session handle or data of the user's 102 selection is transmitted back to the session management server at 108. If merchant communication sessions have not yet been generated, they are generated at S12. At S12, a communicative connection is generated to establish communication between the user device 104 and a merchant communication device 116 (which may or may not be the same merchant communication device 116 used at S1). Communications, within a new communicative connection for a generated merchant communication session, may be automatically generated at S12 and transmitted to the merchant communication device 116 at S13. Alternatively, at S14, the user device 104 may initiate a communicative connection directly with the merchant communication device 116 based on the communication session data provided to it at S9. Still more, a communicative connection between the user device 104 and the merchant communication device 116 may be generated and/or facilitated by a communication server 118, as depicted by the transmission of communication data to the communication server 118 at S15, the reception and processing of communication data at S16, and the transmission of communication data to the merchant communication device 116 at S17. Communications shown by S15, S16, and S17 may be reversed along the same path, from the merchant 115 to the user 102. Additionally, the communication server 118 may obfuscate user 102 data, merchant 115 data, or transaction data at S16 to maintain the privacy of certain information through the communication. It will be appreciated that other configurations are possible.

Figure 4:
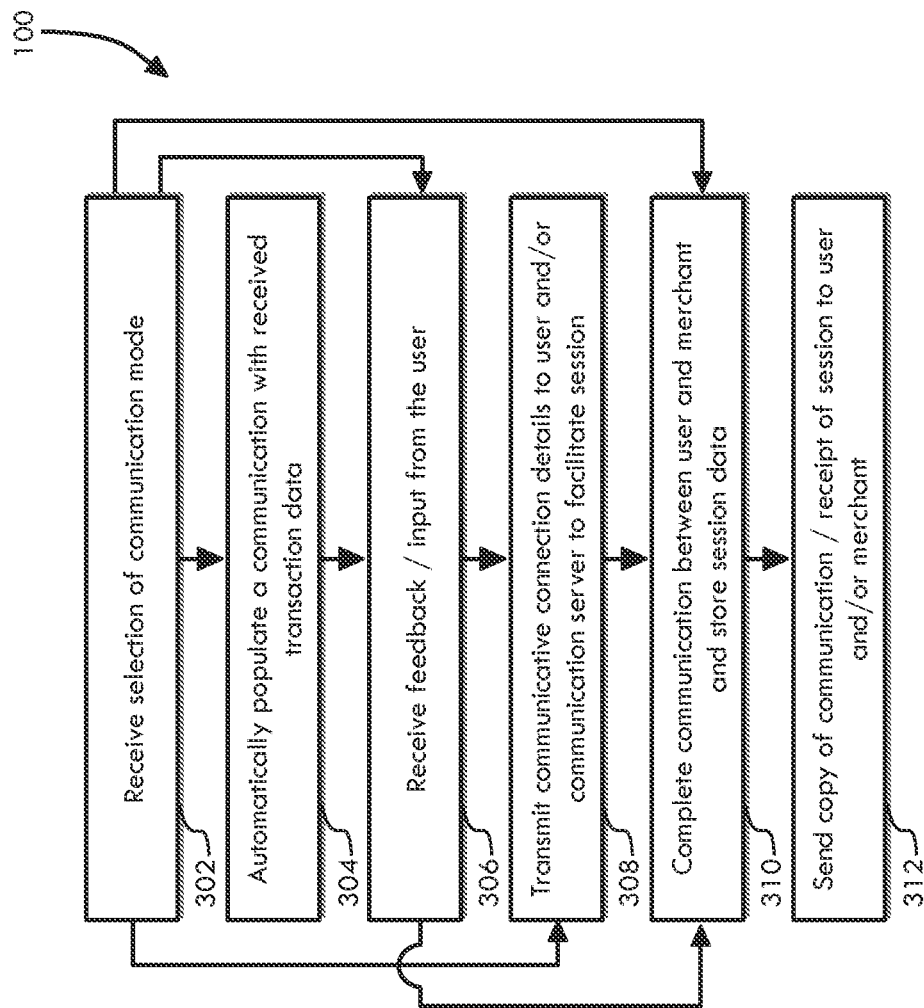
FIG. 4 is a process diagram of some non-limiting embodiments or aspects of a method and system for facilitating communication between a user of a financial account and a merchant associated with at least one transaction with the financial account.

With specific reference to FIG. 4, and in some non-limiting embodiments or aspects, provided is a method and system 100 for facilitating communication between a user of a financial account and a merchant associated with at least one transaction with the financial account. Specifically, provided is a method for execution by at least one processor for receiving a designation of a communication mode and facilitating communication between a user and a merchant. At step 302, the processor receives a selection of a communication mode from a user. At step 304, the processor automatically populates a communication with transaction data received from a user device or from a transaction data database. At step 306, the processor receives feedback/input from the user, to receive any additional information to be included in the communication. At step 308, the processor transmits communication connection details to a communication server to facilitate a communication session between the user and the merchant. Alternatively, at step 308, the processor may transmit the communication connection details to the user device for direct communicative connection with the merchant, or connection through the communication server. At step 310, the processor completes sending the communication, or completes facilitating the communication, between the user and the merchant and may optionally store data related to the communication session. At step 312, the processor optionally sends a copy of the communication or a confirmatory receipt of the session to a user and/or a merchant. Other arrangements are possible, as elaborated below.

With further reference to FIG. 4, and in some non-limiting embodiments or aspects, the diagram displays the variable configuration of the process for facilitating a communicative connection between the user and the merchant. After receiving a selection of a communication mode at step 302, the processor may proceed to receive additional feedback/input from the user at step 306. Alternatively, the processor may proceed from step 302 to step 308, to transmit communicative connection details. Still more, the processor may proceed from receiving the selection in step 302 to automatically completing the communication in step 310 by transmitting an auto-generated message to the merchant. It will further be appreciated that after receiving feedback/input from the user in step 306, the processor may proceed to completing facilitation of the communication session by transmitting a generated message in step 310, instead of intermediately transmitting communication details to the user or communication server. Many other configurations and arrangements are within the scope of the disclosure.

Figure 5:
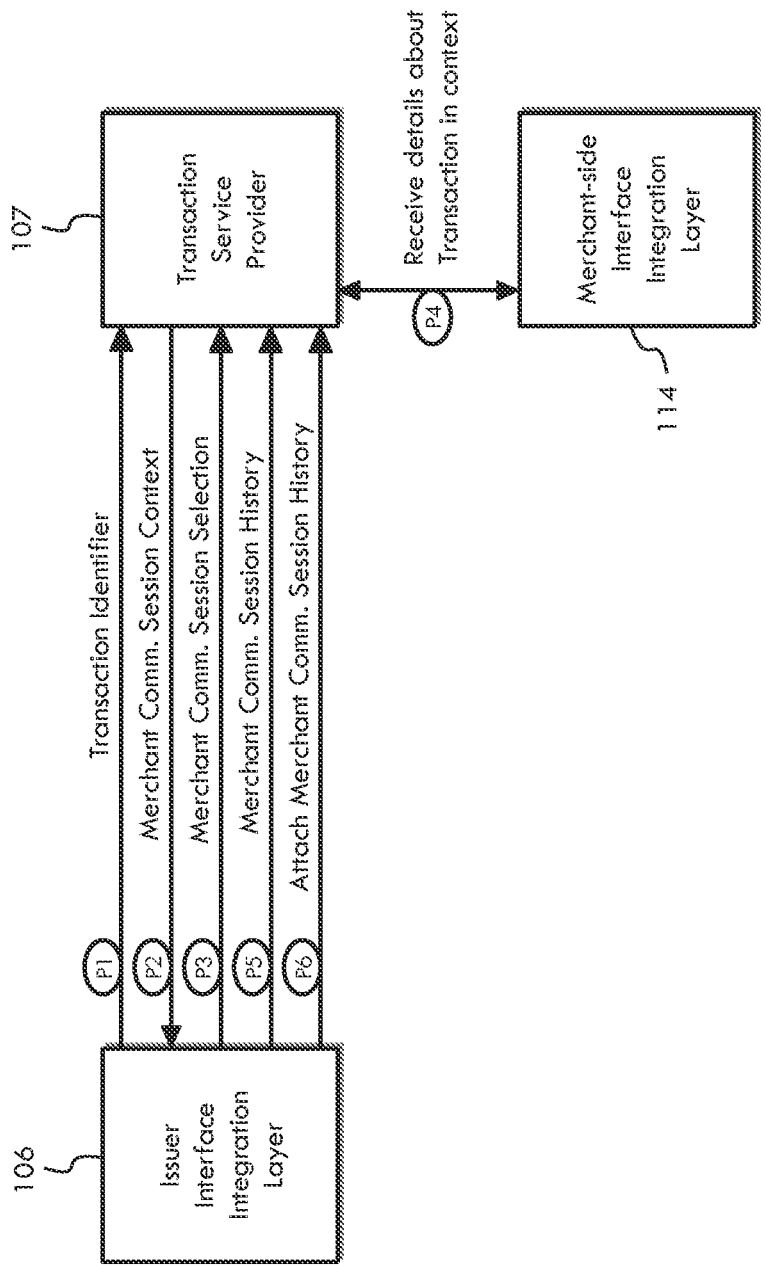
FIG. 5 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 5, provided are some non-limiting embodiments or aspects of the above-described system and method. At step P1, a user interacts with an issuer interface 106 to pass at least one transaction identifier to the transaction service provider 107 to request merchant communication session handles. At step P2, at least one processor of the transaction service provider 107 looks up in its internal database to find configured contact options for the original transaction (corresponding to the transaction identifier) in context. Also at step P2, the processor associated with the transaction service provider 107 creates merchant communication sessions internally and provides handles to the issuer interface 106 integration layer for callback. At step P3, the user decides to contact the merchant via email or phone/SMS, and through interaction with the issuer interface 106 integration layer, provides selection data to the transaction service provider 107. The processor of the transaction service provider 107 loads merchant communication sessions created in the previous steps and enables seamless user communication with the associated merchant. Where the merchant communication mode is hosted through a third party service, such as a chat/messenger service (e.g., AIM, Yahoo, Myspace, Facebook, Google), a cloud/call communication service (e.g., Ooma, Vonage), a videotelephony service (e.g., Skype, FaceTime, Google Hangouts), and/or the like, the processor may create a link or instance through the third party service or provide the endpoint addresses for the parties to communicate with each other. At step P4, merchants interact with a merchant interface 114 integration layer to look up details about the selected transaction in context, using key attributes such as, but not limited to, a provided reference ID in the email or phone number used by the transaction service provider 107 to route the user call to the merchant. At step P5, the transaction service provider 107 facilitates interfaces for issuer institutions to look up historical merchant communication sessions, and issuer institutions may call data from the transaction service provider 107. At step P6, issuer institutions may attach past merchant communication sessions to their transaction dispute cases as part of a dispute resolution process with the transaction service provider 107. It will be appreciated that other configurations and arrangements are possible.

Figure 6:
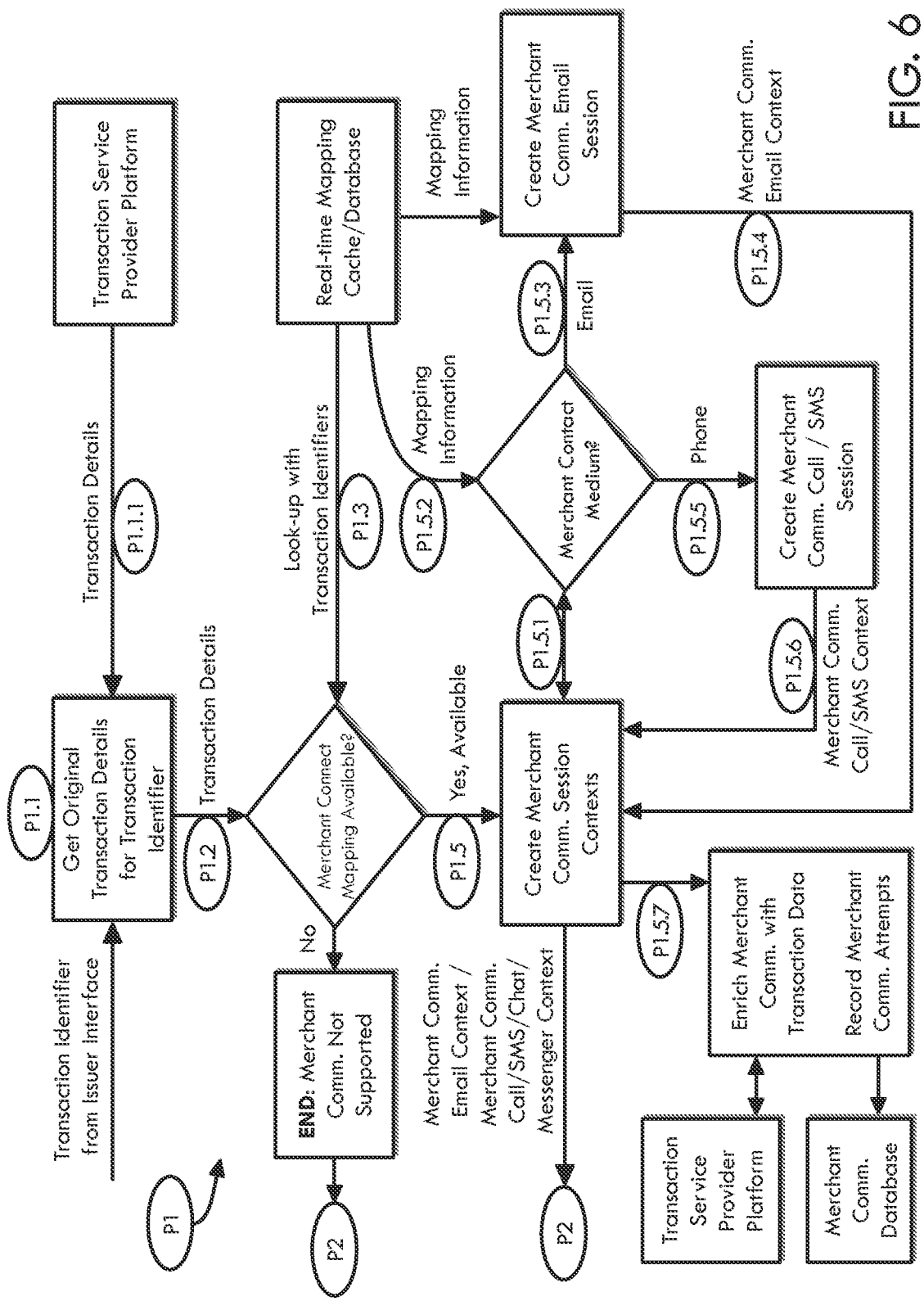
FIG. 6 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 6, provided are some non-limiting embodiments or aspects of the above-described system and method. In particular, shown is step P1, wherein a user interacts with an issuer interface 106 to pass at least one transaction identifier to the transaction service provider 107 to request merchant communication session handles. At step P1.1, at least one processor associated with the transaction service provider 107, receives original transaction data based on the provided transaction identifier. The transaction service provider 107 may be in communication with a transaction service provider platform, which may comprise one or more processors and one or more databases. At step P1.1.1, the processor associated with the transaction service provider receives the transaction details from the transaction service provider platform. At step P1.2, the transaction details are passed to a merchant connection evaluation process, to determine if at least one merchant communication session mapping is available. If there is not at least one merchant communication session mapping available, the processor may provide feedback to the user that merchant communication is not supported when proceeding with step P2, instead of communicating merchant communication session contexts. The user feedback may be active, such as a pop-up message, alert, or notification. The user feedback may also be passive, such as by not providing the user with any communication options. If there is at least one mapping available, the processor may proceed to create merchant communication session contexts at step P1.5. This mapping determination may be completed by communicating with a real-time mapping cache/database at step P1.3 based on a look-up with the provided transaction identifiers. At step P1.5.1, the processor may cycle through each of the available mappings mediums to receive mapping information from the real-time mapping cache/database at step P1.5.2 and generate the respective contexts. Generated contexts may include any suitable communication mode that is text-based, image-based, audio-based, video-based, or any combination thereof. Although email and phone-related contexts are depicted, it will be appreciated that the same process steps may be completed for other contexts, such as chat/messenger services, videotelephony services, and/or the like.

With further reference to the foregoing figures, and with further reference to FIG. 6, at step P1.5.3, for the medium of email, the processor creates a merchant communication email session. At step P1.5.4, the processor generates the associated merchant communication email session context for transmission to the user. At step P1.5.5, for the medium of a phone (or, more generally, a mobile device), the processor creates a merchant communication call/SMS session. At step P1.5.6, the processor generates the associated merchant communication call/SMS session context for transmission to the user. At step P1.5.5, the merchant communication session may be enriched by the processor with transaction data that may also be received from the transaction service provider 107 platform. The processor may also record the merchant communication session attempt in a merchant communication session database (e.g., a merchant data database 112), associating one or more merchant communication sessions with the transaction identifier. Upon completion of generating the merchant communication sessions and their respective contexts, the processor may communicate the contexts (email, call/SMS, etc.) to the user at P2. It will be appreciated that other configurations and arrangements are possible.

Figure 7:
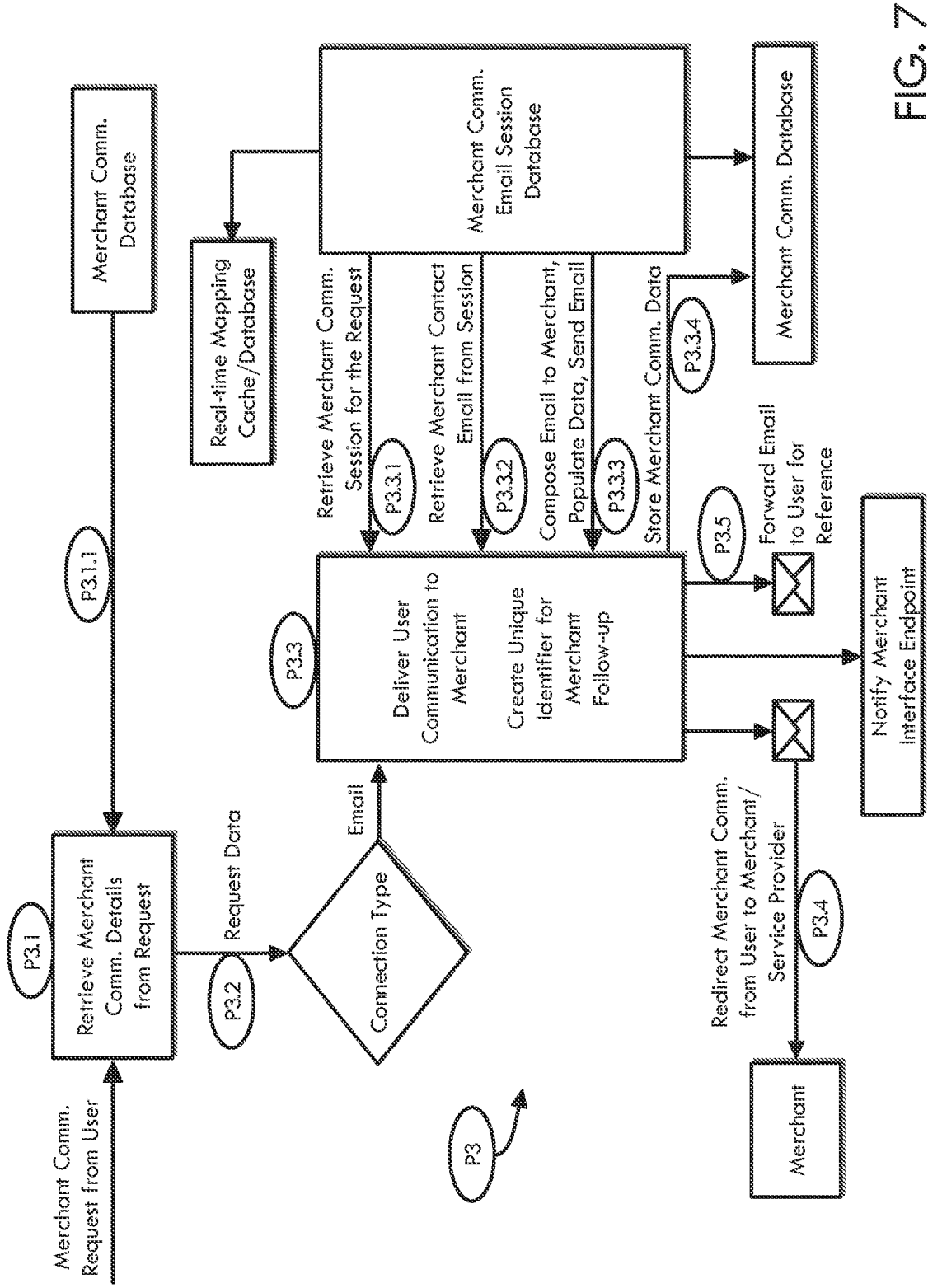
FIG. 7 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 7, provided are some non-limiting embodiments or aspects of the above-described system and method. In particular, shown is a process for receiving a merchant communication email session request from a user, and acting thereon. At step P3.1, at least one processor associated with the transaction service provider retrieves merchant communication details, based on the requested communication session. The processor may be in communication with a merchant communication database to retrieve the merchant communication data at step P3.1.1. At step P3.2, the processor processes the request data to determine the connection type, and based on the type, to produce the requests merchant communication session. At step P3.3, based on the email type, the processor generates and delivers an email communication to the merchant. Also at step P3.3, the processor creates a unique identifier for merchant follow-up with the user. As part of step P3.3, the processor is in communication with a merchant communication email session database, which may be the same database as the merchant communication database, and which may further be in communication with the real-time mapping cache/database. At step P3.3.1, the processor retrieves the merchant communication corresponding to the request. At step P3.3.2, the processor retrieves a merchant contact email for the session. At step P3.3.3, the processor composes an email to the merchant, populates the email with data (e.g., transaction data, communication template data, etc.), and sends the email to the merchant. At step P3.3.4, data concerning the merchant communication session are stored in the merchant communication database. At step P3.4, the merchant email communication is transmitted to the merchant. The email may be transmitted directly from the transaction service provider processor or redirected through the user or through a third party communication service provider. At step P3.5, a copy of the email may be forwarded to the user and/or the associated financial device holder for reference. A separate notification may also be generated in the merchant interface to alert the merchant of receiving a new communication from a user. It will be appreciated that other configurations and arrangements are possible.

Figure 8:
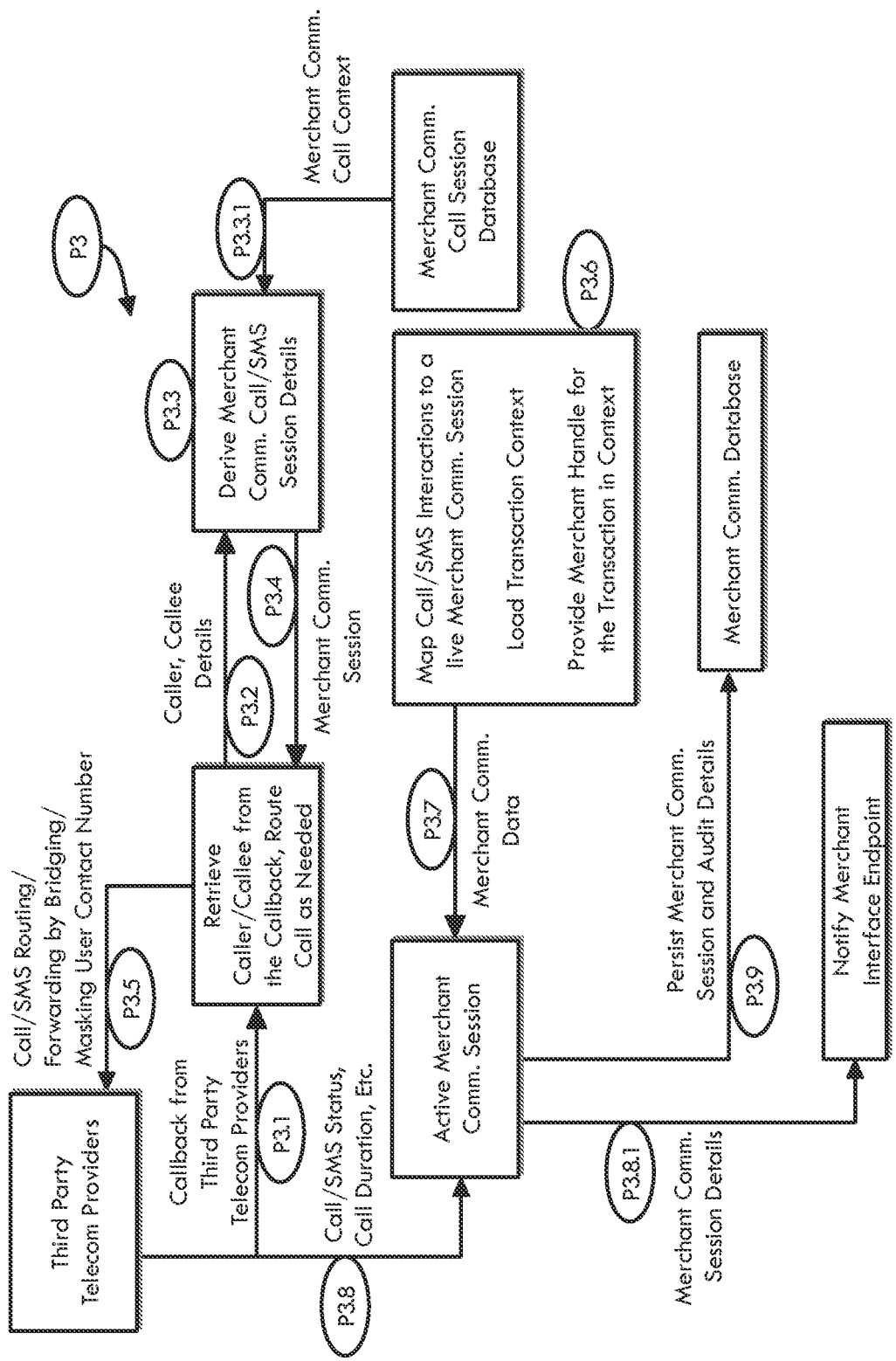
FIG. 8 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 8, provided are some non-limiting embodiments or aspects of the above-described system and method. In particular, provided is a process for facilitating a call/SMS communication session between a user and a merchant. At step P3.1, a user selects phone/SMS as a communication method with the merchant, and in so doing, triggers a callback from third party telecommunication providers. At least one processor associated with the transaction service provider retrieves caller/callee information from the callback and routes the call as needed. At step P3.2, the caller/callee details are processed to derive merchant communication call/SMS session details at step P3.3, via communication with a merchant communication call session database. At step P3.3.1, merchant communication call session contexts are retrieved from the merchant communication call session database. At step P3.4, the determined merchant communication session is processed by the processor to facilitate a phone call, facilitate the SMS routing, forward the call by bridging, and/or mask the user contact number at step P3.5. At step P3.6, the call/SMS interactions are mapped to a live merchant communication session by the processor. Also at step P3.6, transaction contexts are loaded and a handle for the transaction in context is provided to the merchant. This data determined at step P3.6 is provided in step P3.7, such that merchant communication session data can be provided to the merchant interface in step P3.8.1. The merchant communication session and audit details are persisted in step P3.9 in a merchant communication database. It will be appreciated that other configurations and arrangements are possible.

Figure 9:
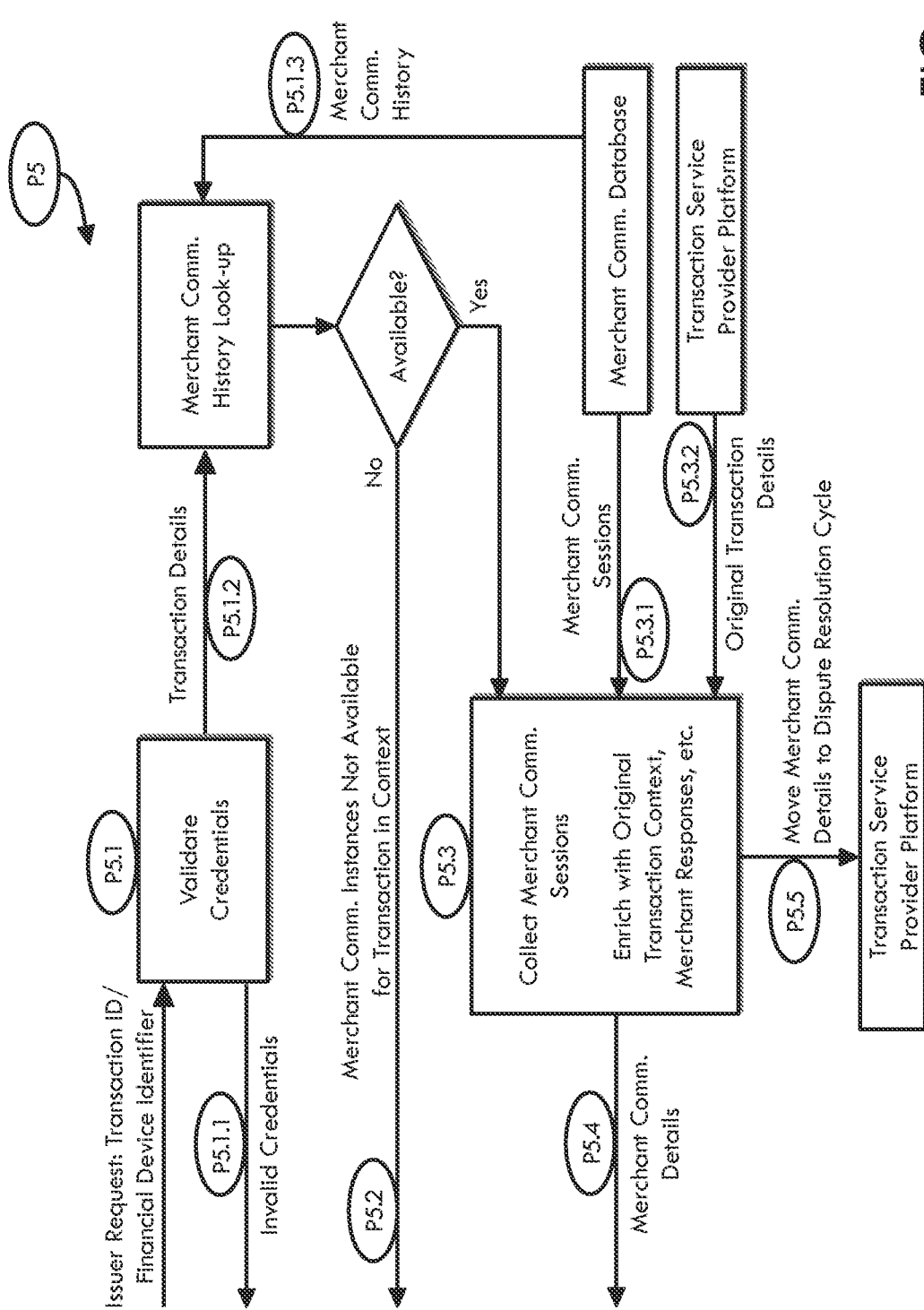
FIG. 9 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 9, provided are some non-limiting embodiments or aspects of the above-described system and method. In particular, provided is a process for merchant communication session history look-up and usage for issuer institution dispute resolution. At step P5.1, an issuer institution request is received with at least a transaction identifier and/or a financial device identifier. Also at step P5.1, the issuer institution's credentials are validated, as part of a security process. If the credentials are invalid, the issuer institution request is rejected at step P5.1.1. If the credentials are valid, the details are provided at step P5.1.2 for merchant communication session history look-up. At least one processor associated with the transaction service provider may be in communication with a merchant communication database to receive a merchant communication history at step P5.1.3. If a merchant communication history is not available, the processor may communicate the lack of history to the issuer institution at step P5.2. If a merchant communication session history is available, the processor may collect merchant communication sessions from the history and enrich the data with original transaction data, merchant responses, and/or the like in step P5.3. As a part of step P5.3, the processor may retrieve merchant communication sessions in step P5.3.1 from the merchant communication database, and the processor may retrieve original transaction data in step P5.3.2 from the transaction service provider platform. The processor may communicate the merchant communication data to the issuer institution at step P5.4, and additionally merchant communication session data may be moved to a dispute resolution cycle in step P5.5 in the transaction service provider platform. It will be appreciated that other configurations and arrangements are possible.

Figure 10:
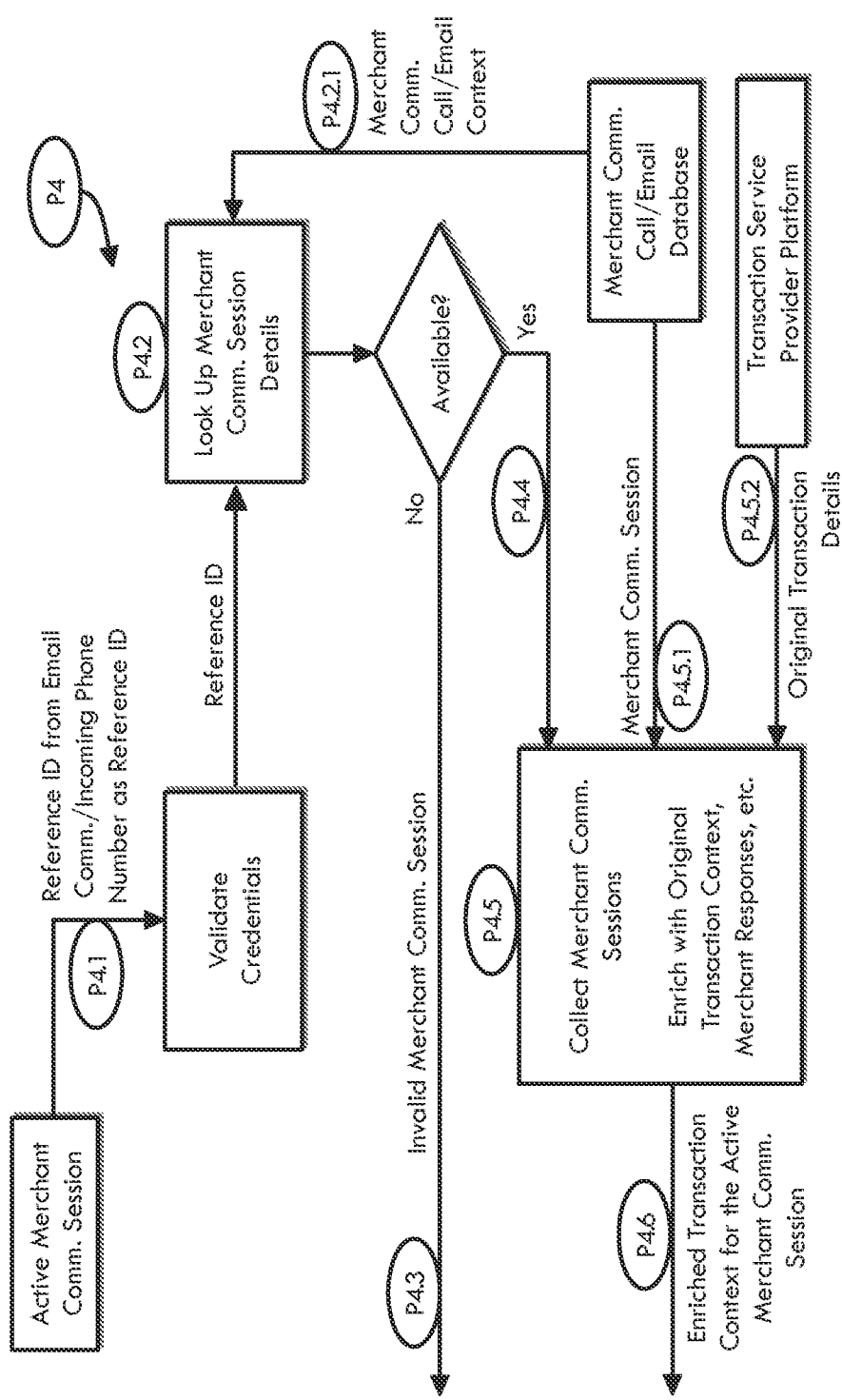
FIG. 10 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 10, provided are some non-limiting embodiments or aspects of the above-described system and method. In particular, provided is a process for merchants to receive transaction data for the active merchant communication session. At step P4.1, at least one processor associated with the transaction service provider receives a reference ID from the active merchant communication session, such as an identifier contained in an email communication, or a phone number being used for a telephonic communication. Upon receiving the reference ID and/or additional credentials from the merchant, the processor validates the credentials. If the credentials are valid, the processor processes the reference ID to look up merchant communication session data at step P4.2. The processor may be in communication with a merchant communication session database to receive merchant communication call/email contexts. If the processor does not identify at least one merchant communication session from the reference ID, the merchant is notified at step P4.3 of the failed match. If the processor does identify at least one merchant communication session from the reference ID at step P4.4, the processor proceeds to collect merchant communication sessions and enrich the sessions with original transaction context, merchant responses, and/or the like in step P4.5. As a part of step P4.5, the processor may receive merchant communication sessions from the merchant communication session database at step P4.5.1. The processor may also receive original transaction data from the transaction service provider platform at step P4.5.2. The enriched transaction context for the active merchant communication session may then be provided to the merchant at step P4.6. It will be appreciated that other configurations and arrangements are possible.

Figure 11:
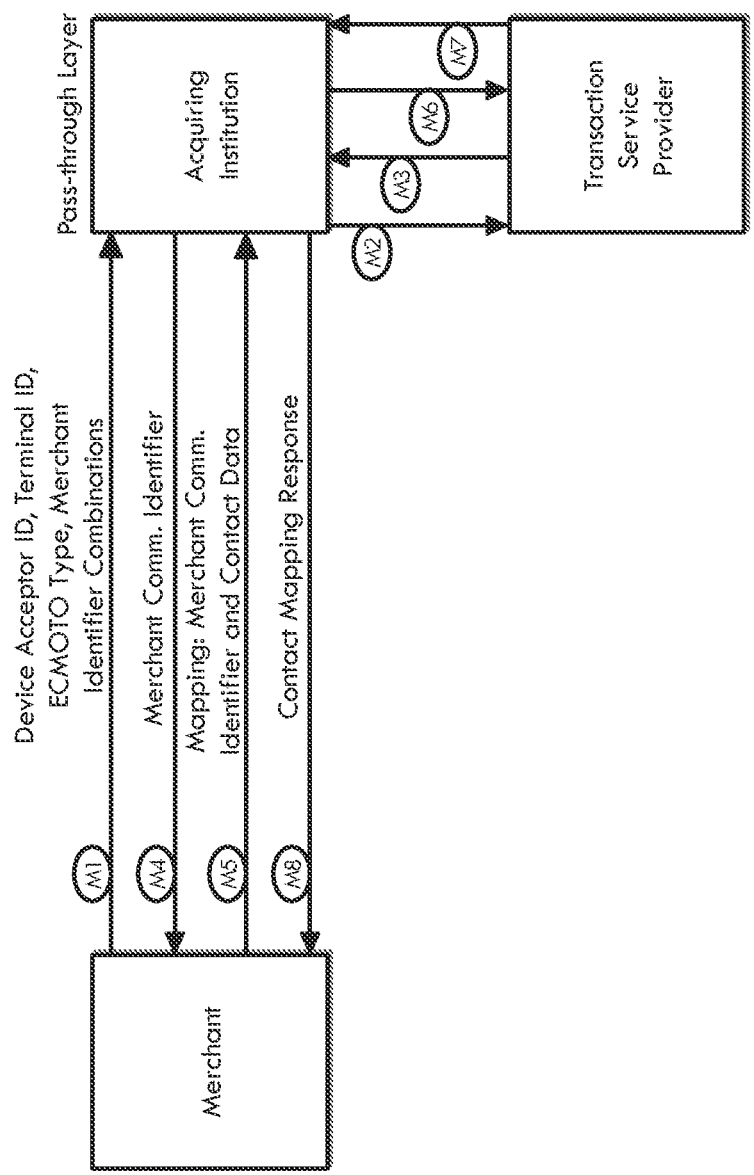
FIG. 11 is a schematic diagram of some non-limiting embodiments or aspects of a method and system for facilitating communication between a user of a financial account and a merchant associated with at least one transaction with the financial account.

With further reference to the foregoing figures, and with specific reference to FIG. 11, provided are some non-limiting embodiments or aspects of the above-described system and method. In particular, provided is a merchant communication data object mapping configuration phase, as carried out between a merchant, a pass-through layer of an acquiring institution, and a transaction service provider. At step M1, the merchant provides its communication setup combinations, each including a financial device acceptor identifier, a terminal identifier, an electronic commerce mail order telephone (ECMOTO) type, a merchant identifier, and/or the like. At step M2, each combination is transmitted to a transaction service provider processor to determine if the combination is an existing mapping or a new mapping, and at step M3, a new or existing merchant communication identifier is provided back through the pass-through layer, representing a merchant communication data object. At step M4, the merchant communication identifier is provided back to the merchant. At step M5, the merchant then may initiate mapping contact data to the merchant communication data object by transmitting contact data and the merchant communication identifier back through the pass-through layer to the transaction service provider. The contact data may include contact type, contact address, contact name, and/or the like. At step M6, the contact data and the merchant communication identifier are passed to the transaction service provider processor to attempt to map the contact data to the merchant communication data object. Whether the mapping was a success or a failure, that feedback is transmitted from the transaction service provider at step M7, and it is provided to the merchant from the pass-through layer at step M8. It will be appreciated that other configurations and arrangements are possible.

Figure 12:
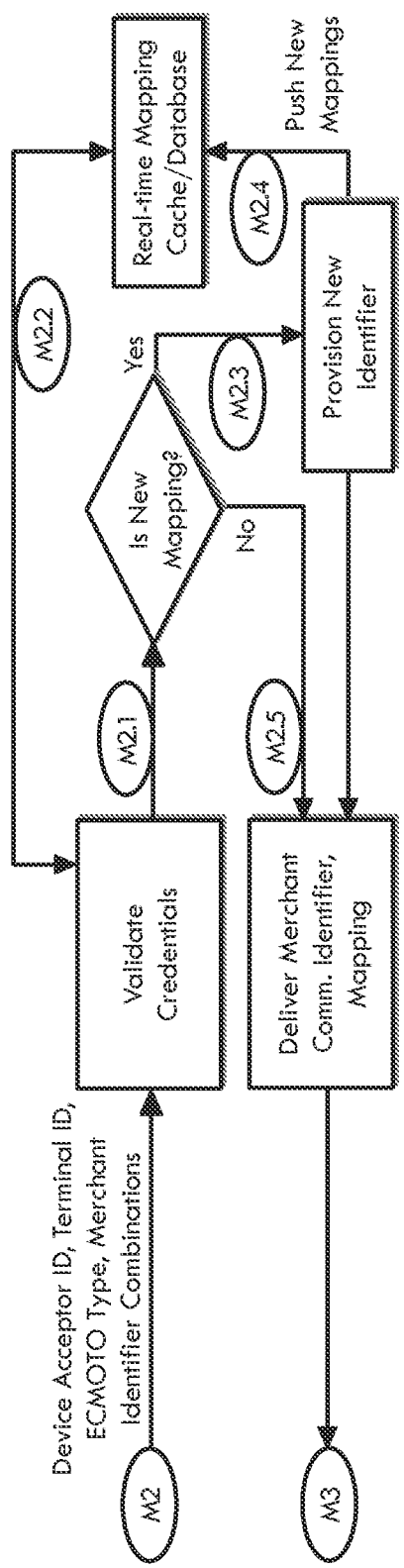
FIG. 12 is a schematic diagram of some non-limiting embodiments or aspects of a method and system for facilitating communication between a user of a financial account and a merchant associated with at least one transaction with the financial account.

With further reference to the foregoing figures, and with specific reference to FIGS. 11 and 12, provided are some non-limiting embodiments or aspects of the above-described system and method. In particular, provided is the process internal to the transaction service provider for merchant communication data object mapping, as occurring between steps M2 and M3. At least one processor of the transaction service receives the merchant communication combinations, including device acceptor ID, terminal ID, ECMOTO type, merchant identifier, and/or the like. The merchant's credentials are first validated, facilitated by communication with a real-time mapping cache/database. If the credentials are validated, the processor proceeds at step M2.1 to evaluate if the mapping is new or not. If the mapping is not new, the merchant communication identifier associated with the existing mapping is transmitted from the transaction service provider at step M3. If the mapping is new, the processor proceeds at step M2.3 to provision a new merchant communication identifier, and the associated mapping is pushed to the real-time mapping cache/database at step M2.4. After a new merchant communication identifier is provisioned, it is transmitted from the transaction service provider at step M3. It will be appreciated that other configurations and arrangements are possible.

Figure 13:
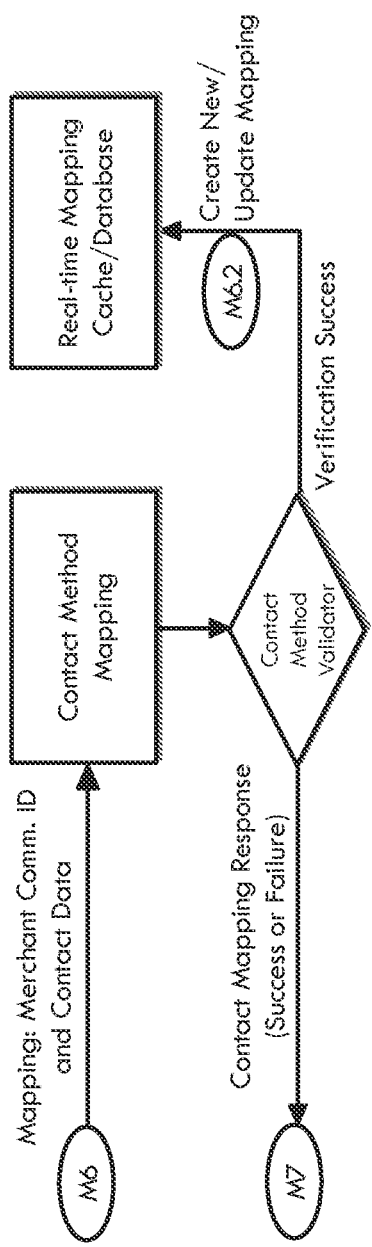
FIG. 13 is a schematic diagram of some non-limiting embodiments or aspects of a method and system for facilitating communication between a user of a financial account and a merchant associated with at least one transaction with the financial account.

With further reference to the foregoing figures, and with specific reference to FIGS. 11 and 13, provided are some non-limiting embodiments or aspects of the above-described system and method. In particular, provided is the process internal to the transaction service provider for merchant communication contact data mapping, as occurring between steps M6 and M7. At step M6, at least one processor of the transaction service provider receives a merchant communication identifier and contact data. The processor attempts to map the contact data, representing a method of contacting the merchant, to the merchant communication data object represented by the merchant communication identifier. This process is evaluated by a contact method validator. If the mapping is successfully verified, the mapping is created/updated at step M6.2 and stored in the real-time mapping cache/database. The success or failure of mapping the contact data to the merchant communication data object is then communicated from the transaction service provider processor at step M7. It will be appreciated that other configurations and arrangements are possible.

Although the disclosure has been described in detail for the purpose of illustration based on what is currently considered to be the most practical and preferred and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
receiving, with at least one processor of a session management server, via an issuer interface, at least one transaction identifier of at least one transaction between a user and a merchant, wherein the session management server is arranged communicatively between the issuer interface and a merchant device of the merchant, wherein the session management server is separate from and operated independently from the issuer interface and the merchant device of the merchant, wherein the session management server is a server configured to generate one or more communication sessions that facilitate communication between users and merchants, and wherein the issuer interface is a user interface provided by an issuer institution associated with a financial device of the user;
determining, with at least one processor of the session management server, the merchant associated with the at least one transaction based on the at least one transaction identifier;
in response to determining the merchant, determining, with at least one processor of the session management server, at least one merchant communication mode associated with the merchant, the at least one merchant communication mode predetermined by the merchant and representative of at least one of the following types of computer communication: text, image, audio, video, or any combination thereof;
in response to determining the at least one merchant communication mode, generating, with at least one processor of the session management server, at least one visual representation of the at least one merchant communication mode on a user device of the user by transmitting, via the issuer interface, merchant contact data to the user device;
receiving, with at least one processor of the session management server, via the issuer interface, at least one selected communication mode of the at least one merchant communication mode from the user device; and
in response to receiving the at least one selected communication mode:

generating, with at least one processor of the session management server, a merchant communication session between the user device and the merchant device of the merchant, the merchant communication session associated with the at least one selected communication mode;

generating, with at least one processor of the session management server, a communicative connection for the merchant communication session between the user device and the merchant device based on the at least one selected communication mode;

routing, with at least one processor of the session management server, at least a portion of communicated data along a path through the communicative connection from the user device, through the issuer interface, through the session management server, to the merchant device; and obfuscating, with at least one processor of the session management server, at least a portion of user data in the at least a portion of communicated data while routing the at least a portion of communicated data from the user device to the merchant device through the communicative connection.

2. The computer-implemented method of claim 1, further comprising associating, with at least one processor of the session management server, a plurality of merchant communication sessions with the at least one transaction identifier.

3. The computer-implemented method of claim 2, further comprising:
retrieving, with at least one processor of the session management server from a transaction data database, transaction data representative of the at least one transaction; and
generating, with at least one processor of the session management server, a dispute resolution record in at least one database, the dispute resolution record comprising at least a portion of the transaction data and the plurality of merchant communication sessions between the user and the merchant associated with the at least one transaction identifier.

4. The computer-implemented method of claim 3, further comprising transmitting, with at least one processor of the session management server, a list of the plurality of merchant communication sessions and at least a portion of the transaction data to at least one of the user device, the merchant device, and the issuer institution associated with the issuer interface.

5. The computer-implemented method of claim 1, further comprising:
retrieving, with at least one processor of the session management server from a transaction data database, transaction data representative of the at least one transaction;
modifying, with at least one processor of the session management server, the merchant communication session to comprise at least a portion of the transaction data of the transaction represented by the at least one transaction identifier, the transaction data comprising at least one of the following: financial device holder identification data, transaction amount, transaction time, transaction description, or any combination thereof; and
transmitting, with at least one processor of the session management server, at least a portion of the transaction data to at least one of the user device and the merchant device of the merchant.

6. The computer-implemented method of claim 5, wherein the communicative connection of the merchant communication session is generated in a network environment, such that at least one of the following conditions is satisfied: only specified financial account data is transmitted to the merchant device, only specified merchant data is transmitted to the user device, or any combination thereof.

7. The computer-implemented method of claim 1, wherein the merchant communication session comprises audio communication data, the method further comprising facilitating a telephonic connection between the user device and the merchant device.

8. The computer-implemented method of claim 1, wherein the merchant communication session comprises text communication data, and wherein facilitating the communicative connection for the merchant communication session comprises automatically populating an email, messenger, chat, or short message service (SMS) communication at least partly with transaction data and transmitting the email, messenger, chat, or SMS communication to the merchant device.

9. The computer-implemented method of claim 1, further comprising receiving, with at least one processor of the session management server via a merchant interface separate from the issuer interface, one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

10. The computer-implemented method of claim 1, further comprising:
generating, with at least one processor of the session management server, a merchant communication session identifier associated with the merchant communication session;
transmitting, with at least one processor of the session management server, the merchant communication session identifier to the user device upon generation of the merchant communication session; and
storing, with at least one processor of the session management server, the merchant communication session identifier in association with the at least one transaction identifier in at least one database.

11. A system comprising:
a session management server including at least one processor, wherein the session management server is arranged communicatively between an issuer interface and a merchant device of a merchant, wherein the session management server is separate from and operated independently from the issuer interface and the merchant device of the merchant, wherein the session management server is a server configured to generate one or more communication sessions that facilitate communication between users and merchants, wherein the issuer interface is a user interface provided by an issuer institution associated with a financial device of the user, and wherein the session management server is at least one of programmed and configured to:
receive, via the issuer interface, at least one transaction identifier of at least one transaction between a user and the merchant;
determine the merchant associated with the at least one transaction based on the at least one transaction identifier;

in response to determining the merchant, determine at least one merchant communication mode associated with the merchant, the at least one merchant communication mode predetermined by the merchant and representative of at least one of the following types of computer communication: text, image, audio, video, or any combination thereof;

in response to determining the at least one merchant communication mode, generate at least one visual representation of the at least one merchant communication mode on a user device of the user by transmitting, via the issuer interface, merchant contact data to the user device;

receive, via the issuer interface, at least one selected communication mode of the at least one merchant communication mode from the user device; and in response to receiving the at least one selected communication mode:

generate a merchant communication session between the user device and the merchant device of the merchant, the merchant communication session associated with the at least one selected communication mode;

generate a communicative connection for the merchant communication session between the user device and the merchant device based on the at least one selected communication mode;

route at least a portion of communicated data along a path through the communicative connection from the user device, through the issuer interface, through the session management server, to the merchant device; and obfuscate at least a portion of user data in the at least a portion of communicated data while routing the at least a portion of communicated data from the user device to the merchant device through the communicative connection.

12. The system of claim 11, wherein the session management server is further at least one of programmed and configured to:

retrieve, from a transaction data database, transaction data representative of the at least one transaction;

modify the merchant communication session to comprise at least a portion of the transaction data of the transaction represented by the at least one transaction identifier, the transaction data comprising at least one of the following: financial device holder identification data, transaction amount, transaction time, transaction description, or any combination thereof; and transmit at least a portion of the transaction data to at least one of the user device and the merchant device of the merchant.

13. The system of claim 12, wherein the communicative connection of the merchant communication session is generated in a network environment, such that at least one of the following conditions is satisfied: only specified financial account data is transmitted to the merchant device, only specified merchant data is transmitted to the user device, or any combination thereof.

14. The system of claim 11, wherein the session management server is further at least one of programmed and configured to receive, via a merchant interface separate from the issuer interface, one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

15. The system of claim 11, wherein the session management server is further at least one of programmed and configured to:

generate a merchant communication session identifier associated with the merchant communication session;

transmit the merchant communication session identifier to the user device upon generation of the merchant communication session; and store the merchant communication session identifier in association with the at least one transaction identifier in at least one database.

16. A computer program product comprising at least one non-transitory computer-readable medium comprising program instructions that, when executed by at least one processor of a session management server, cause the at least one processor to:

receive, via an issuer interface, at least one transaction identifier of at least one transaction between a user and a merchant, wherein the session management server is arranged communicatively between the issuer interface and a merchant device of the merchant, wherein the session management server is separate from and operated independently from the issuer interface and the merchant device of the merchant, wherein the session management server is a server configured to generate one or more communication sessions that facilitate communication between users and merchants, and wherein the issuer interface is a user interface provided by an issuer institution associated with a financial device of the user;

determine the merchant associated with the at least one transaction based on the at least one transaction identifier;

in response to determining the merchant, determine at least one merchant communication mode associated with the merchant, the at least one merchant communication mode predetermined by the merchant and representative of at least one of the following types of computer communication: text, image, audio, video, or any combination thereof;

in response to determining the at least one merchant communication mode, generate at least one visual representation of the at least one merchant communication mode on a user device of the user by transmitting, via the issuer interface, merchant contact data to the user device;

receive, via the issuer interface, at least one selected communication mode of the at least one merchant communication mode; and in response to receiving the at least one selected communication mode:

generate a merchant communication session between the user device and the merchant device of the merchant, the merchant communication session associated with the at least one selected communication mode;

generate a communicative connection for the merchant communication session between the user device and the merchant device based on the at least one selected communication mode;

route at least a portion of communicated data along a path through the communicative connection from the user device, through the issuer interface, through the session management server, to the merchant device; and obfuscate at least a portion of user data in the at least a portion of communicated data while routing the at least a portion of communicated data from the user device to the merchant device through the communicative connection.

17. The computer program product of claim 16, wherein the program instructions further cause the at least one processor to:

retrieve, from a transaction data database, transaction data representative of the at least one transaction;

modify the merchant communication session to comprise at least a portion of the transaction data of the transaction represented by the at least one transaction identifier, the transaction data comprising at least one of the following: financial device holder identification data, transaction amount, transaction time, transaction description, or any combination thereof; and transmit at least a portion of the transaction data to at least one of the user device and the merchant device of the merchant.

18. The computer program product of claim 17, wherein the communicative connection of the merchant communication session is generated in a network environment, such that at least one of the following conditions are satisfied: only specified financial account data is transmitted to the merchant device, only specified merchant data is transmitted to the user device, or any combination thereof.

19. The computer program product of claim 16, wherein the program instructions further cause the at least one processor to receive, via a merchant interface separate from the issuer interface, one or more designated merchant communication modes from the merchant, the one or more designated merchant communication modes representative of permitted communication modes and comprising a mapping of preferred contact data for each designated communication mode, and wherein the at least one merchant communication mode is determined from the one or more designated merchant communication modes.

20. The computer program product of claim 16, wherein the program instructions further cause the at least one processor to:

generate a merchant communication session identifier associated with the merchant communication session;

transmit the merchant communication session identifier to the user device upon generation of the merchant communication session; and store the merchant communication session identifier in association with the at least one transaction identifier in at least one database.

\* \* \* \* \*